(12) United States Patent
Hsu et al.

(10) Patent No.: US 10,611,983 B2
(45) Date of Patent: Apr. 7, 2020

(54) MICROENCAPSULATION OF CHEMICAL ADDITIVES

(71) Applicant: The George Washington University, Washington, DC (US)

(72) Inventors: Stephen M. Hsu, Germantown, MD (US); Fei Zhao, Ashburn, VA (US)

(73) Assignee: The George Washington University, Washington, DC (US)

( * ) Notice: Subject to any disclaimer, the term of this patent is extended or adjusted under 35 U.S.C. 154(b) by 0 days.

(21) Appl. No.: 15/311,119

(22) PCT Filed: May 15, 2015

(86) PCT No.: PCT/US2015/031090
§ 371 (c)(1),
(2) Date: Nov. 14, 2016

(87) PCT Pub. No.: WO2015/175947
PCT Pub. Date: Nov. 19, 2015

(65) Prior Publication Data
US 2017/0073610 A1    Mar. 16, 2017

Related U.S. Application Data

(60) Provisional application No. 62/056,968, filed on Sep. 29, 2014, provisional application No. 61/993,805, filed on May 15, 2014.

(51) Int. Cl.
*B32B 3/26* (2006.01)
*B05B 5/00* (2006.01)
(Continued)

(52) U.S. Cl.
CPC ............ *C10M 169/04* (2013.01); *B01J 13/14* (2013.01); *B01J 13/18* (2013.01); *C10M 101/02* (2013.01);
(Continued)

(58) Field of Classification Search
CPC ............................ B01J 103/02; C10M 141/06
(Continued)

(56) References Cited

U.S. PATENT DOCUMENTS 3,418,656 A    12/1968  Vassiliades
4,333,849 A *  6/1982  Pack ................... B01J 13/18
                                              427/213.34
(Continued)

FOREIGN PATENT DOCUMENTS

CN         101348600 A       1/2009
WO     WO-2013/053450 A1    4/2013

OTHER PUBLICATIONS

International Preliminary Report on Patentability and Written Opinion for PCT/US2015/031090, dated Nov. 15, 2016, 9 pages.
(Continued)

*Primary Examiner* — Prem C Singh
*Assistant Examiner* — Francis C Campanell
(74) *Attorney, Agent, or Firm* — Blank Rome LLP

(57) ABSTRACT

The present disclosure relates to new and optimized processes for the preparation of micro- and nano-scale capsules containing lubricant chemical additives. The present disclosure also relates to micro- and nano-scale capsules prepared by such processes, which are useful in a variety of applications, including automotive lubricants, diesel lubricants, industrial lubricants, metal-working lubricants, coolants, and process fluids. Micro-and nano-scale capsules prepared as described herein have the required properties that such capsules need to exhibit in order to function effectively and meet the requirements imposed by engine lubrication conditions. The microcapsules may be dispersed in a lubricating oil such that the lubricant exhibits improved stability and anti-wear performance, thereby improving engine fuel efficiency and performance.

22 Claims, 16 Drawing Sheets

(51) Int. Cl.
*C07D 251/54* (2006.01)
*C10M 169/04* (2006.01)
*B01J 13/18* (2006.01)
*B01J 13/14* (2006.01)
*C11D 17/00* (2006.01)
*C10M 101/02* (2006.01)
*C10M 149/20* (2006.01)
*C10M 149/22* (2006.01)

(52) U.S. Cl.
CPC ........ *C10M 149/20* (2013.01); *C10M 149/22* (2013.01); *C11D 17/0039* (2013.01); *C10M 2203/022* (2013.01); *C10M 2215/02* (2013.01); *C10M 2217/045* (2013.01); *C10M 2217/046* (2013.01); *C10M 2223/045* (2013.01); *C10N 2230/06* (2013.01); *C10N 2230/10* (2013.01); *C10N 2250/02* (2013.01); *C10N 2250/16* (2013.01)

(58) Field of Classification Search
USPC .............. 508/258, 285; 428/321.1; 427/151
See application file for complete search history.

(56) References Cited

U.S. PATENT DOCUMENTS

| | | |
|---|---|---|
| 4,533,616 A | 8/1985 | Ohsaki et al. |
| 5,112,541 A | 5/1992 | Friend |
| 5,160,529 A | 11/1992 | Scher et al. |
| 5,922,652 A | 7/1999 | Kowalski et al. |
| 6,056,992 A | 5/2000 | Lew |
| 6,330,818 B1 | 12/2001 | Jain |
| 6,689,388 B2 | 2/2004 | Kuhrts |
| 6,846,779 B1 | 1/2005 | Hinterwaldner et al. |
| 6,953,593 B2 | 10/2005 | Kuhrts |
| 7,993,749 B2 | 8/2011 | Berkland et al. |
| 2001/0008874 A1 | 7/2001 | Igari et al. |
| 2005/0129946 A1 | 6/2005 | Hayashi |
| 2008/0279935 A1 | 11/2008 | Wahren et al. |
| 2010/0022697 A1 | 1/2010 | Rodriguez Romero et al. |
| 2010/0083873 A1 | 4/2010 | Oxley |
| 2010/0087115 A1 | 4/2010 | Davis et al. |
| 2010/0187439 A1 | 7/2010 | Oxley et al. |
| 2010/0297446 A1 | 11/2010 | Oxley et al. |
| 2011/0015568 A1 | 1/2011 | Persyn et al. |
| 2012/0129742 A1 | 5/2012 | Matray et al. |
| 2013/0146009 A1* | 6/2013 | Pederson ............. C10M 169/04 123/1 A |
| 2013/0196071 A1 | 8/2013 | Yang et al. |
| 2014/0087982 A1 | 3/2014 | Calcavecchio et al. |

OTHER PUBLICATIONS

International Search Report and Written Opinion for PCT/US2015/031090, dated Aug. 21, 2015, 12 pages.

\* cited by examiner

A

B

C

A

B

A

B

MICROENCAPSULATION OF CHEMICAL ADDITIVES

This application is a national stage of International Patent Application No. PCT/US2015/031090, filed May 15, 2015, which claims the benefit of U.S. Provisional Application Nos. 61/993,805, filed May 15, 2014, and 62/056,968, filed Sep. 29, 2014, the entire contents of each of which is hereby incorporated by reference.

FIELD OF THE INVENTION

The present invention relates to new and optimized processes for the preparation of micro- and nano-scale capsules containing lubricant chemical additives. The present invention also relates to micro- and nano-scale capsules prepared by such processes, which are useful in a variety of applications, including automotive lubricants, diesel lubricants, industrial lubricants, metal-working lubricants, coolants, and process fluids. Micro- and nano-scale capsules prepared as described herein have the required properties that such capsules need to exhibit in order to function effectively and meet the requirements imposed by engine lubrication conditions. The microcapsules may be dispersed in a lubricating oil such that the lubricant exhibits improved stability and anti-wear performance, thereby improving engine fuel efficiency and performance.

BACKGROUND OF THE INVENTION

Encapsulation is a physio-chemical process by which chemicals, solids, or gases are enclosed in a shell which prevents the capsulate from interacting with the environment or surrounding chemicals. Capsules can be made from many materials, including membranes, polymers, and fibers of various kinds. Most of the capsules are spherical in shape and the diameters range from nanometers to millimeters. Irregular shaped capsules are also feasible, when crystalline solids are encapsulated. The capsulate can also be embedded in the shell matrix of fibers and substrates. The encapsulation enables the capsulate to reach the area of action without being adversely affected by the environment or surrounding chemicals.

The principal reasons for encapsulation include: isolation and protection of the active chemical so that it will not be lost or degraded; separation of incompatible components; increased stability (protection of the encapsulated materials against oxidation or deactivation due to reaction with the environment); controlled release of active agents (sustained steady state release or delayed burst release). Microencapsulation has been used in various fields including agriculture, food, pharmaceuticals, medicines, cosmetics, textiles, electronics, graphics, printing and defense. The active agents may include drugs, enzymes, vitamins, pesticides, flavors, pigments, and self-repairing agent and initiators.

Microencapsulation has been developed over 70 years and to a large extent, is a mature technology widely used in a large array of industries as mentioned above. However, most applications are in a relatively passive environment without active hostile actions, such as a shear actions from oil pumps, sliding surfaces contacts such as ring-liner sliding, or cam-lifter actions or overhead cam bearing etc. in engines. Therefore, the kind of chemical agents that may be encapsulated are limited to relatively pure compounds and mixture of simple chemicals.

In engine lubricant applications, in addition to the severe mechanical sliding actions, the lubricant itself is composed of base oils and additives, creating a complex chemical soup where small particles are dispersed by dispersants, surfaces are cleaned by detergents, and acids are neutralized by, for example, metal sulfonates with micelles of calcium carbonates.

When using polymeric capsules, the mechanical strength and associated properties usually cannot withstand constant shearing, high contact pressures, or combination of high temperatures and pressures such as those encountered in engine lubricant applications. Complex additive compounds (such as a complex mixtures of molecular weights, functional groups, and/or compounds with nanoparticles embedded into the molecular structures) including dispersants, detergents, overbased materials, and antiwear agents have not been successfully encapsulated due to their complexity and charge driven aggregation tendencies. The combination of a hostile chemical environment and a highly stressed mechanical environment typically renders conventional microencapsulation technology ineffective.

There is therefore a need for new encapsulation processes for complex additives for use, for example, in lubricant applications.

The following references may provide background to the present invention: U.S. Pat. Nos. 5,112,541 and 6,330,818 and U.S. Publication Nos. 2010/0297466 and 2014/0087982.

SUMMARY OF THE INVENTION

The present inventors have developed new processes for the preparation of micro- and nano-scale capsules containing chemical additives that may be used, for example, in lubrication applications. The microcapsules are surprisingly tougher and more chemical resistant that previously known microcapsules. The present inventors have achieved this by controlling, for example, one or more of the processes parameters involved (such as, for example, processing conditions, emulsifiers, pH ranges, temperatures, reaction sequences, cooling, mechanical energy inputs, and polymer chemistries employed) in order to control the resulting shell polymeric structure, shell wall thickness, porosity, cross-linking, and deposition of nanoparticles covering the shell wall of the microparticles. Specific active sites on the shell may also be introduced by inserting small amount of specific liable functional groups or reinforced by nanoparticles or multilayer polymeric shells.

Additionally, microcapsules prepared by the processes described herein retain their original functionality so as to function in high hostility environments, such as the high temperature (>150° C.), high shear stress (GPa levels) and contact pressure (up to ~800 MPa) mechanical environments found in, e.g., operating engines (such as in cars and trucks) containing sliding interfaces, with high mechanical loading and high temperatures (e.g., piston ring-cylinder liner interfaces), transmission gears, wind turbine gears and highly stressed shearing interfaces of steel parts, making them ideal as lubricant components in such environments.

The processes described herein may be used to prepare micro- and nano-capsules containing chemical additives (microcapsules) that provide one or more of the following benefits:

1. Provides timed release of the chemical additive for long term protection of engines.
2. Avoids deleterious additive-additive interactions, reducing effective dosage of the additive.
3. Allows for the formation of microcapsules containing multiple chemical additives that function synergistically and may be delivered to the point of use when triggered to release. This "mini-additive package" technology simplifies current additive packaging technology, reduces waste of valuable chemicals and enhances performance, by allowing each additive to function at its full potential without being tied up in aggregations.

4. Provides new ways to package additives into mini-packages and increases efficiency in lubrication.
5. Delivers the desired chemistry at the right time and the right place to achieve performance not possible using current encapsulation technology.
6. Increases efficiency of lubrication by delivering the correct amount of additive for maximum effect.
7. Reduces waste by increasing the effective dosage of additive to be delivered, thereby also lowering costs and providing environmental benefits (e.g., less waste oil going into the environment).
8. Allows the introduction of biodegradable agents to accelerate the safe and rapid decomposition of waste fluids.

Microcapsules prepared by the processes described herein are useful in a variety of applications, including, but not limited to, automotive lubricants, diesel lubricants, industrial lubricants, metal-working lubricants, coolants, and process fluids.

In one aspect, the present invention relates to an in situ process for the encapsulation of one or more chemical additives (i.e., the preparation of microcapsules).

In one embodiment, the process comprises:
(i) forming an aqueous solution comprising one or more emulsifiers;
(ii) adding a curing catalyst (e.g., ammonium chloride) and a cross-linking agent (e.g., resorcinol) to the product of step (i) at a pH of between about 3.0 and about 4.0 to form an emulsion;
(iii) adding one or more chemical additives to the emulsion of step (ii);
(iv) adding a solution comprising (i) formaldehyde, paraformaldehyde or a combination thereof, and (ii) urea, melamine, or a combination thereof, to the product of step (iii); and
(v) heating the product of step (iv) to form microcapsules of the encapsulated chemical additive.

In additional embodiments, the process further comprises:
(vi) cooling the microcapsules; and
(vii) isolating the microcapsules.

In one embodiment, the solution of step (i) comprises between about 0.1 and about 1.0 wt. % of one or more emulsifiers, such as between about 0.2 and about 0.8 wt. % of one or more emulsifiers.

In one embodiment, the weight ratio of curing catalyst (e.g., ammonium chloride) to cross-linking agent (e.g., resorcinol) added in step (ii) is about 1:1.

In one embodiment, the weight ratio of curing catalyst (e.g., ammonium chloride) to cross-linking agent (e.g., resorcinol) added in step (ii) is about 1:1 when the solution in step (iv) comprises formaldehyde and urea.

In one embodiment, step (ii) is conducted at a pH between about 2 and about 5, such as between about 3 and about 4.

In one embodiment, the molar ratio of (i) formaldehyde, paraformaldehyde or a combination thereof, to (ii) urea, melamine, or a combination thereof, added in step (iv) is about 1 to about 3, such as about 1.5 to about 2.5, for example about 1 to about 1.9.

In one embodiment, step (v) involves heating to a temperature between about 45° C. and about 80° C., such as between about 50° C. and about 80° C., between about 50° C. and about 70° C., between about 50° C. and about 60° C., or between about 55° C. and about 65° C.

In one embodiment, step (v) involves heating at a rate of between about 0.5 and about 5° C./min, such as between about 1 and about 2° C./min, such as at about 1° C./min.

In another embodiment, step (v) involves heating for a period of time between about 2 and about 6 hours, such as between about 3 and about 5 hours, for example for about 5 hours.

In one embodiment, step (vi) involves cooling the microcapsules to room temperature. In one embodiment, step (vi) involves cooling the microcapsules while stirring is maintained.

In one embodiment, step (vii) involves isolating the microcapsules by filtration, such as filtration under vacuum. In one embodiment, step (vii) involves isolating the microcapsules by centrifugation. In one embodiment, step (vii) involves isolating the microcapsules by flotation separation.

In another embodiment, step (vii) further comprises washing the microcapsules with one or more solvents (such as, for example, water, acetone, hexane, and any combination thereof). In another embodiment, step (vii) further comprises washing the microcapsules with one or more solvents wherein the one or more solvents result in microcapsules that (i) have a smooth cell surface and (ii) are free-flowing.

In another embodiment, step (vii) further comprises drying the microcapsules, for example at a temperature of between about 25° C. and about 50° C., such as between about 25° C. and about 35° C., for example at about room temperature. For example, the drying is conducted for a period of time between about 24 and about 48 hours, such as between about 24 and about 36 hours, for example, for about 24, about 36 or about 48 hours.

In another embodiment, the process comprises:
(i) preparing a prepolymer from a mixture of (i) formaldehyde, paraformaldehyde or a combination thereof, and (ii) urea, melamine, or a combination thereof;
(ii) preparing an aqueous mixture comprising one or more chemical additives and one or more emulsifiers;
(iii) adding the prepolymer of step (i) to the mixture of step (ii);
(iv) adjusting the pH of the mixture of step (iii) to between about 2 and about 5 (e.g., between about 2.5 and about 4.0); and
(v) heating the product of step (iv) to form microcapsules of the encapsulated chemical additive.

In additional embodiments, the process further comprises:
(vi) cooling the resulting microcapsules; and
(vii) isolating the microcapsules.

In one embodiment, step (i) comprises heating the mixture of (i) formaldehyde, paraformaldehyde or a combination thereof, and (ii) urea, melamine, or a combination thereof, at a temperature between about 50° C. and about 90° C., such as between about 50° C. and about 70° C., between about 60° C. and about 80° C., for example at about 70° C. For example, step (i) comprises heating the mixture of mixture of (i) formaldehyde, paraformaldehyde or a combination thereof, and (ii) urea, melamine, or a combination thereof, for a period of time between about 1 and about 5 hours, between about 1 and about 3 hours, between about 1 and about 2 hours, for example for about 1.5 hours.

In one embodiment, step (iii) is conducted at a stirring rate between about 500 and about 2000 rpm, such as between about 600 and about 1400 rpm, about 800 and about 1200 rpm, or about 1000 rpm.

In one embodiment, step (iv) comprises adjusting the pH to between about 2 and about 4, such as between about 3 and about 4.

In one embodiment, step (v) involves heating to a temperature between about 45° C. and about 80° C., such as between about 50° C. and about 80° C., between about 50° C. and about 70° C., between about 50° C. and about 60° C., or between about 55° C. and about 65° C. For example, step (v) involves heating for a period of time between about 2 and about 6 hours, such as between about 3 and about 5 hours, for example for about 3.5 hours or about 5 hours.

In one embodiment, step (vi) involves cooling the microcapsules to room temperature. In one embodiment, step (vi) involves cooling the microcapsules while stirring is maintained.

In one embodiment, step (vii) involves isolating the microcapsules by filtration, such as filtration under vacuum. In one embodiment, step (vii) involves isolating the microcapsules by centrifugation. In one embodiment, step (vii) involves isolating the microcapsules by flotation separation.

In another embodiment, step (vii) further comprises washing the microcapsules with one or more solvents (such as, for example, water, acetone, hexane, and any combination thereof). For example, step (vii) further comprises washing the microcapsules with one or more solvents wherein the one or more solvents result in microcapsules that (i) have a smooth cell surface and (ii) are free-flowing.

In another embodiment, step (vii) further comprises drying the microcapsules, for example at a temperature of between about 25° C. and about 50° C., such as between about 25° C. and about 35° C., for example at about room temperature. For example, the drying is conducted for a period of time between about 24 and about 48 hours, such as between about 24 and about 36 hours, for example, for about 24, about 36 or about 48 hours.

In a further embodiment, the process comprises:
(i) forming an aqueous phase comprising one or more emulsifiers;
(ii) forming a solution of a prepolymer comprising a mixture of formaldehyde and melamine in one or more solvents;
(iii) adding one or more chemical additives to the product of step (ii);
(iv) heating the product of step (iii) to form an oil phase;
(v) adding the oil phase of step (iv) to the aqueous phase of step (i) to form an emulsion;
(vi) adding an acid to the emulsion of step (v);
(vii) heating the product of step (vii) to form microcapsules of the encapsulated chemical additive.

In additional embodiments, the process further comprises:
(viii) cooling the resulting microcapsules; and
(ix) isolating the microcapsules.

In one embodiment, step (i) is conducted at a temperature between about 40° C. and about 75° C., such as between about 50° C. and about 70° C., between about 40° C. and about 60° C., for example between about 45° C. and about 55° C.

In one embodiment, the one or more solvents in step (ii) are selected from the group consisting of aromatic solvents (e.g., toluene), alcohols (e.g., ethanol, isopropanol) ethers (e.g., tetrahydrofuran), and any combination thereof. In one embodiment, the solvent in toluene.

In one embodiment, step (iv) involves heating to a temperature between about 30° C. and about 60° C., between about 30° C. and about 50° C., for example between about 30° C. and about 40° C. For example, step (iv) involves heating for a period of time between about 0.5 and about 5 hours, such as between about 1 and about 2 hours, for example for about 1 hour.

In one embodiment, step (v) is conducted at a temperature between about 25° C. and about 60° C., such as between about 25° C. and about 40° C., for example, at about room temperature.

In one embodiment, step (v) is conducted at a stirring rate between about 500 and about 20000 rpm, about 250 and about 1250 rpm, or between about 500 and about 1000 rpm.

In one embodiment, the acid in step (vi) is an organic acid. In one embodiment, the acid in step (vi) is selected from the group consisting of hydrochloric acid, sulfuric acid, nitric acid, citric acid, acetic acid, p-toluenesulfonic acid, phosphoric acid, and any combination thereof. In one embodiment, the acid is sulfuric acid (e.g., 3 M $H_2SO_4$).

In one embodiment, step (vii) involves heating to a temperature between about 45° C. and about 80° C., such as between about 50° C. and about 80° C., between about 50° C. and about 70° C., between about 50° C. and about 60° C., or between about 55° C. and about 65° C. For example, step (vii) involves heating for a period of time between about 2 and about 6 hours, such as between about 3 and about 5 hours, for example for about 3.5 hours or about 5 hours.

In one embodiment, step (viii) involves cooling the microcapsules to room temperature. In one embodiment, step (viii) involves cooling the microcapsules while stirring is maintained.

In one embodiment, step (ix) involves isolating the microcapsules by filtration, such as filtration under vacuum. In one embodiment, step (ix) involves isolating the microcapsules by centrifugation. In one embodiment, step (ix) involves isolating the microcapsules by flotation separation.

In another embodiment, step (ix) further comprises washing the microcapsules with one or more solvents (such as, for example, water, acetone, hexane, and any combination thereof). For example, step (ix) further comprises washing the microcapsules with one or more solvents wherein the one or more solvents result in microcapsules that (i) have a smooth cell surface and (ii) are free-flowing.

In another embodiment, step (ix) further comprises drying the microcapsules, for example at a temperature of between about 25° C. and about 50° C., such as between about 25° C. and about 35° C., for example at about room temperature. For example, the drying is conducted for a period of time between about 24 and about 48 hours, such as between about 24 and about 36 hours, for example, for about 24, about 36 or about 48 hours.

In a further embodiment, the process comprises:
(i) forming an aqueous phase comprising one or more emulsifiers;
(ii) forming a solution of a polymer selected from the group consisting of polymethylmethacrylate, poly(melamine-formaldehyde), poly(melamine, paraformaldehyde), poly(urea-formaldehyde), poly(urea-paraformaldehyde), polystyrene, and combinations thereof) in one or more solvents;
(iii) adding one or more chemical additives to the solution of step (ii);
(iv) heating the product of step (iii) to form an oil phase;
(v) adding the oil phase of step (iv) to the aqueous phase of step (i) to form an emulsion;
(vi) adding an acid to the emulsion of step (v);
(vii) heating the product of step (vii) to form microcapsules of the encapsulated chemical additive.

In additional embodiments, the process further comprises:
(viii) cooling the resulting microcapsules; and
(ix) isolating the microcapsules.

In one embodiment, step (i) is conducted at a temperature between about 40° C. and about 70° C., such as between about 40° C. and about 60° C., for example between about 45° C. and about 55° C.

In one embodiment, the one or more solvents in step (ii) are selected from the group consisting of aromatic solvents (e.g., toluene), alcohols (e.g., ethanol, isopropanol) ethers (e.g., tetrahydrofuran), chlorinated solvents (e.g., chloroform, dichloromethane, dichloroethane) and any combination thereof. In one embodiment, the solvent in toluene.

In one embodiment, step (iv) involves heating to a temperature between about 25° C. and about 60° C., such as between about 25° C. and about 40° C., or between about 30° C. and about 40° C. For example, step (v) involves heating for a period of time between about 1 and about 5 hours, such as between about 1 and about 3 hours, for example for about 1.5 hours or about 2 hours.

In one embodiment, step (v) is conducted at a temperature between about 25° C. and about 50° C., such as between about 25° C. and about 35° C., for example at about room temperature.

In one embodiment, step (v) is conducted at a stirring rate between about 500 and about 2000 rpm, such as between about 500 and about 1000 rpm.

In one embodiment, the acid in step (vi) is an organic acid. In one embodiment, the acid in step (vi) is selected from the group consisting of hydrochloric acid, sulfuric acid, nitric acid, citric acid, acetic acid, p-toluenesulfonic acid, phosphoric acid, and any combination thereof. In one embodiment, the acid is sulfuric acid (e.g., 3 M $H_2SO_4$).

In one embodiment, step (vii) involves heating to a temperature between about 45° C. and about 80° C., such as between about 50° C. and about 80° C., between about 50° C. and about 70° C., between about 50° C. and about 60° C., or between about 55° C. and about 65° C. For example, step (vii) involves heating for a period of time between about 2 and about 6 hours, such as between about 3 and about 5 hours, for example for about 3.5 hours or about 5 hours.

In one embodiment, step (viii) involves cooling the microcapsules to room temperature. In one embodiment, step (viii) involves cooling the microcapsules while stirring is maintained.

In one embodiment, step (ix) involves isolating the microcapsules by filtration, such as filtration under vacuum. In one embodiment, step (ix) involves isolating the microcapsules by centrifugation. In one embodiment, step (ix) involves isolating the microcapsules by flotation separation.

In another embodiment, step (ix) further comprises washing the microcapsules with one or more solvents (such as, for example, water, acetone, hexane, and any combination thereof). For example, step (ix) further comprises washing the microcapsules with one or more solvents wherein the one or more solvents result in microcapsules that (i) have a smooth cell surface and (ii) are free-flowing.

In another embodiment, step (ix) further comprises drying the microcapsules, for example at a temperature of between about 25° C. and about 50° C., such as between about 25° C. and about 35° C., for example at about room temperature. For example, the drying is conducted for a period of time between about 24 and about 48 hours, such as between about 24 and about 36 hours, for example, for about 24, about 36 or about 48 hours.

In one embodiment of any of the processes described herein, the resulting microcapsules have a size (diameter) of between about 2 and about 40 microns, such as between about 2.5 and about 35 microns, between about 3 and about 35 microns, between about 3 and about 30 microns, between about 3 and about 28 microns, between about 5 and about 30 microns or between about 5 and about 25 microns. In a preferred embodiment, the microcapsules have a size greater than about 2 microns and less than about 40 microns, such as greater than about 5 microns and less than about 30 microns. In one embodiment, the microcapsules have a size between about 5 microns and about 30 microns. In another embodiment, the microcapsules have a size between about 5 microns and about 25 microns In another embodiment, the microcapsules have a size between about 3 microns and about 28 microns.

In one embodiment of any of the processes described herein, a single microcapsule contains more than one chemical additive (such as 2 or 3 chemical additives), wherein each chemical additive may have, for example, a range of molecular weights. In one embodiment, the activity of the more than one chemical additives in the single microcapsule is synergistic (i.e., the activity observed for a combination of additives A and B is greater than that that would be expected based on the activities of additives A and B alone).

In another embodiment of any of the processes described herein, a single capsule ("a mother capsule") having a size of between, for example, about 5 to about 100 microns or about 2 and about 40 microns (such as about between about 5 and about 28 microns) may contain one or more smaller capsules having a size less than, for example, about 2 microns (such as less than about 1 micron, or in the nanometer range). When the mother capsule releases its contents (i.e., when the mother capsule is triggered), the one or more smaller capsules may, for example, enter the sliding bearing interfaces of an engine and provide antiwear action, thereby reducing the attrition of the one or more smaller capsules being entangled by viscosity modifiers, dispersants, and other chemical and mechanical interferences.

In one embodiment, any of the capsules described herein release their contents (i.e., are triggered) by a trigger release mechanism that may be based on one or more of: the design of the polymer chemistry used in the encapsulation processes described herein, the insertion of bonds into the polymer chains, and the processing of the capsules. Trigger release mechanisms include, but are not limited to, 1) mechanical rupture of the capsule wall; 2) dissolution or melting of the shell; 3) diffusion through the wall; 4) oxidation/degradation of the shell; 5) attack by the triggering agent(s); 6) embedded chemistry in the shell that gradually age and degrade, creating holes that allow the release of additives. The release can be triggered by design. For example, the trigger release mechanism may be selected from temperature induced release, pH change induced release, ionic species released from one capsule to initiate breakup of other types of capsules, mechanical compressive limit release, shear stress limit release, dissolution of the capsule wall by solvent release from different capsules, exoelectrons, plasma ions released from rubbing and surface induced capsule release.

In a further aspect, the present invention relates to a microcapsule according to any of the embodiments described herein, prepared by any of the processes described herein.

In a further aspect, the present invention relates to a microcapsule comprising
(i) a core comprising one or more chemical additives; and
(ii) a shell or membrane enclosing the core;

wherein (a) the microcapsule has a size of between about 5 and about 30 microns (e.g., between about 5 and about 25 microns), and (b) the shell or membrane enclosing the core has a thickness of between about 0.4 and about 3 microns (e.g., between about 0.4 and about 2 or between about 0.4 and about 1.5 microns, such as between about 0.4 and about 0.5 microns).

In another aspect the present invention relates to a microcapsule comprising
(i) core comprising one or more chemical additives; and
(ii) a shell or membrane enclosing the core;
wherein (a) the microcapsule has a size of between about 5 and about 30 microns (e.g., between about 5 and about 25 microns), and (b) the shell or membrane enclosing the core is (i) stable at a temperature of at least about 200° C. and (ii) is of sufficient mechanical strength to be stable at a shear level of at least 1 GPa.

In another embodiment, the present invention relates to a microcapsule having a size of between about 2 and about 40 microns (such as between about 5 and about 28 microns) comprising one or more capsules having a size less than about 2 microns (such as less than about 1 micron).

In a further embodiment, any of the microcapsules described herein further comprises one or more biodegradable agents.

In a further embodiment, any of the microcapsules described herein further comprises one or more solid metal nanoparticles, inorganic compounds, or a mixture thereof.

In a further embodiment, any of the microcapsules described herein further comprises one or more self-repairing or self-healing agents (e.g. one or more agents such as monomers, initiators, catalysts, polymerization agents, and any combination thereof) effective to promote self-repairing or self-healing of the microcapsule).

In another aspect, the present invention relates to a lubricant comprising a microcapsule according to any of the embodiments described herein.

DETAILED DESCRIPTION OF THE INVENTION

Figure 1:
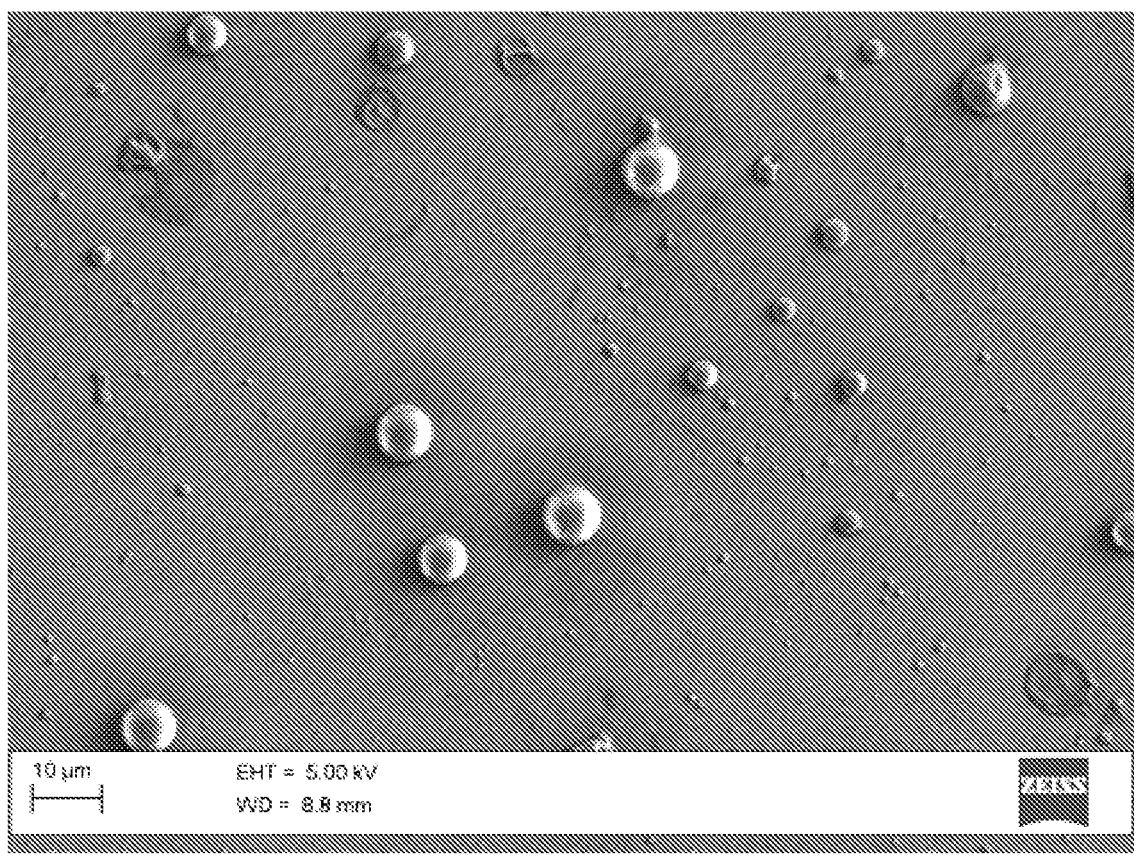
FIG. 1 shows a scanning electron microscope (SEM) image of poly(urea-formaldehyde) (PUF) microcapsules prepared according to the present invention.

In engine lubrication or other lubrication systems, the performance of the lubricant is controlled by the overall formulation (a composition of various additives with specific concentrations) that has gone through actual engine dynamometer sequence tests (ASTM engine sequence tests) and passed the performance specifications set by SAE, ASTM, and API standard-setting bodies. The concentration of each additive type is a delicate balance of cost, performance, and additive-additive interactions. If the balance is not maintained, the additives may precipitate and render the lubricant useless.

In lubricant formulations, base oils of various purities are the solvent and additives are the solute. Additives are added to the solution to impart various performance bench marks. Two types of additives are typically used: (i) those that control the bulk property such as antioxidants, dispersants, detergents, viscosity modifiers, and antifoam agents; and (ii) those that control surface properties, such as antiwear agents, corrosion inhibitors, rust inhibitors, and surface deactivators. The bulk property control agents are either neutrally charged or less polar than the surface active agents. The surface active agents have a somewhat hierarchical polarity stacking order to arrange themselves against the sliding surfaces. The antiwear agent has to be able to adsorb and react with the metal surface to perform its antiwear function, so the decomposition products of the antiwear agent (ZDDP, zinc dialkyl dithio-phosphate) have to react with the surface active sites. The formulation has to be delicately balanced to avoid precipitation and adverse additive-additive interactions rendering some or most of the additives non-functioning. When commonly used dispersants and detergents are mixed in solution in a specific concentration ratio, the reversed micelle size grows exponentially to form precipitates.

Current lubricant formulations typically contain 10-18% by wt. of additives (viscosity modifier, dispersants, detergents, and inhibitors, etc.) depending on the viscosity grades and intended duty cycles. The dispersant level alone can go up to 7-8% by wt.

The dispersant and viscosity index improver constitute the two chemicals dominating in the bulk oil solution phase. The high dosage level of these two additives makes it very difficult for new additives (small surface active molecules) in small amounts to function without interacting with or being engulfed by these two dominating additives. Hence, the introduction of new chemicals has become increasingly difficult and has become the major barrier to introducing new promising additive chemistry, such as nanoparticle-based chemistry, and lubricating film formation enhancer to increase near surface viscosity instead of increasing the bulk viscosity at high temperatures. These approaches have been found to be effective in pure base oils. However, when the same chemistry is tested in fully formulated oils, they do not function. This is one of the major challenges in formulating new lubricants.

Microencapsulation involves the use of emulsifiers to create tiny bubbles enclosing the intended encapsulate. With monomers and initiator added, the polymerization of monomers at the water-oil interface creates polymeric shells containing the intended additive or additives. The shell polymer chemistry and the reaction conditions control the microcapsule properties such as mechanical strength, shell thickness, porosity, permeability, and thermal stability, etc. The shell polymer chemistry and the degree of cross-linking can be designed to effect different ways for the capsule to release the additive.

In evaluating various polymer chemistries and processing techniques, four steps have developed in encapsulating lubricant additives:

1) Encapsulation;
2) Recovery of the capsulate;
3) Functionality of recovered material;
4) Validation of the properties necessary for lubricant applications.

The present inventors have developed new processes for the preparation of micro- and nano-scale capsules containing chemical additives that may be used, for example, in lubrication applications. Microcapsules prepared by the processes described herein are surprisingly tougher and more chemical resistant that previously known microcapsules. The present inventors have achieved this by controlling, for example, one or more of the processes parameters involved (such as processing conditions, emulsifiers, pH ranges, temperatures, reaction sequences, cooling, mechanical energy inputs, and polymer chemistries employed) in order to control the resulting shell polymeric structure, shell wall thickness, porosity, cross-linking, and deposition of nanoparticles covering the shell wall of the microparticles. Specific active sites on the shell may also be introduced by inserting small amount of specific liable functional groups or reinforced by nanoparticles or multilayer polymeric shells.

Suitable emulsifiers for use in any of the processes described herein include, but are not limited to, sodium dodecyl sulfate, sodium dodecylbenzenesulfonate, dioctyl sulfosuccinate sodium, poly(ethylene-alt-maleic anhydride), gum arabic, hexadecyltrimethylammonium bromide, poly (vinyl alcohol), poly(styrene-co-maleic anhydride), polyethylene glycol, polypropylene glycol, polyoxyethylene octyl phenyl ether, polysorbates (such as TWEEN® 20, TWEEN® 40, TWEEN® 60, TWEEN® 80) sorbitan esters (such as SPAN® 60), and any combination thereof.

Microcapsules

As used herein, the term "microcapsules" means hollow microcapsules comprising a solid or liquid core and a shell or membrane (typically polymeric) enclosing the solid or liquid core. The microcapsules contain one or more lubricant chemical additives, or combinations of additives, to be protected and to be released in controlled manner.

In certain embodiments, the microcapsules prepared as described herein have a size (diameter of the microcapsules) of between about 2 and about 40 microns, such as between about 2.5 and about 35 microns, between about 3 and about 35 microns, between about 3 and about 30 microns, between about 3 and about 28 microns, between about 5 and about 30 microns or between about 5 and about 25 microns. In a preferred embodiment, the microcapsules described herein have a size greater than 2 microns and less than 40 microns. In a preferred embodiment, the microcapsules described herein have a size between about 3 and about 30 microns. In a preferred embodiment, the microcapsules described herein have a size between about 5 and about 25 microns In another preferred embodiment, the microcapsules described herein have a size between about 3 and about 28 microns In other embodiments, the microcapsules described herein have a size of about 3, about 5, about 7.5, about 10, about 12.5, about 15, about 17.5, about 20, about 22.5, about 25, about 27.5 or about 30 microns.

In further embodiments, the microcapsules described herein exhibit a bimodal size distribution (as observed by SEM).

In one embodiment of any of the microcapsules prepared as described herein, the core is substantially free (e.g., contains less than about 5%, less than about 4%, less than about 3%, less than about 2%, less than about 1%, less than about 0.5%, less than about 0.1%, less than about 0.05%, less than about 0.01% or less than about 0.001%) of polar solvent. In another embodiment of any of the microcapsules prepared as described herein, the core is free of (contains no) polar solvent.

In additional embodiments, the cell or membrane thickness of the microcapsules prepared as described herein (as measured by SEM) is between about 0.2 and about 4 microns, such as between about 0.5 and about 2 microns, between about 0.2 and about 1.5 microns, between about 0.2 and about 1.0 microns, between about 0.25 and about 0.75 microns or between about 0.2 and about 0.5 microns. In one embodiment, the cell or membrane thickness of the microcapsules prepared as described herein (as measured by SEM) is between about 0.4 and about 0.5 microns, such as between about 0.425 and about 0.475 microns. In further embodiments, the cell or membrane thickness of the microcapsules prepared as described herein (as measured by SEM) is about 0.40, about 0.41, about 0.42, about 0.43, about 0.44, about 0.45, about 0.46, about 0.47, about 0.48, about 0.49 or about 0.50 microns.

In another embodiments, the microcapsule cell or membrane comprises one or more polymers selected from, but not limited to, poly(ethylene glycol)s, poly(methacrylate)s, poly(styrene)s, cellulose, poly(lactide)s, poly(lactide-co-glycolide)s, and combinations thereof. Specific examples of polymers include, but are not limited to, poly(urea-paraformaldehyde) poly(melamine-paraformaldehyde), poly (urea-formaldehyde) and poly(melamine-formaldehyde).

The microcapsule cell or membrane may also comprise one or more non-polymeric materials such as, but not limited to, gelatin, acacia, and combinations thereof.

In further embodiments, any of the microcapsules prepared as described herein have a smooth cell surface (e.g., contain no residual polymer and/or emulsifier on cell surface) (as measured by SEM).

Chemical Additives

The microcapsules prepared as described herein include one or more chemical additives.

In one embodiment, the one or more chemical additives are selected from the group consisting of lubricant additives (such as, but not limited to, antioxidants, detergents, dispersants, antiwear additives, surface deactivators, acid neutralizing agents, lubricant film enhancers, smart viscosity modifiers, corrosion inhibitors, rust inhibitors, high base materials, reparative agents, power point depressants, seal compatibility agents, antifoam agents, and viscosity index improvers), heat transfer agents (such as, but not limited to, phase change materials, local heat sinks and heat sources), surface reactivity control agents (such as, but not limited to, metal nanoparticles); and any active agents that may be used to improve the performance of existing lubrication systems or to enable performance levels that cannot be reached by the existing technology, and any combination thereof Antioxidants Antioxidants retard the oxidative degradation of base oils during service. Such degradation may result in deposits on metal surfaces, the presence of sludge, or a viscosity increase in the lubricant. One skilled in the art knows a wide variety of oxidation inhibitors that are useful in lubricating oil compositions. See, e.g., Klamann, *Lubricants and Related Products: Synthesis, Properties, Applications, International Standards*, March 1984, and U.S. Pat. Nos. 4,798,684 and 5,084,197.

Useful antioxidants may include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with $C_6$+ alkyl groups and the alkylene coupled derivatives of these hindered phenols. Examples of phenolic materials of this type include, but are not limited to, 2-t-butyl-4-heptyl phenol; 2-t-butyl-4-octyl phenol; 2-t-butyl-4-dodecyl phenol; 2,6-di-t-butyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic to antioxidants may include, for example, hindered 2,6-di-alkyl-phenolic proprionic ester derivatives. Bis-phenolic antioxidants may also be advantageously used. Examples of ortho-coupled phenols include, for example, 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include, for example, 4,4'-bis(phenol) and 4,4'-methylene-bis(2,6-di-t-butyl phenol).

Non-phenolic oxidation inhibitors which may be used include aromatic amine antioxidants and these may be used either as such or in combination with phenolics. Typical examples of non-phenolic antioxidants include, for example, alkylated and non-alkylated aromatic amines such as aromatic monoamines of the formula $R^8R^9R^{10}N$ where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$ where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to 20 carbon atoms, and preferably contains from 6 to 12 carbon atoms. The aliphatic group is a saturated aliphatic group. Preferably, both $R^8$ and $R^9$ are aromatic or substituted aromatic groups, and the aromatic group may be a fused ring aromatic group such as napthyl. Aromatic groups $R_8$ and $R_9$ may be joined together with other groups such as S.

Typical aromatic amines antioxidants have alkyl substituent groups of at least 6 carbon atoms. Examples of aliphatic groups include, for example, hexyl, heptyl, octyl, nonyl, and decyl. Generally, the aliphatic groups will not contain more than 14 carbon atoms. The general types of amine antioxidants useful in the present mnicrocapsules include, for example, diphenylamines, phenyl naphthylamines, phenothiazines, imidodibenzyls and diphenyl phenylene diamines. Mixtures of two or more aromatic amines may also be used. Polymeric amine antioxidants can also be used. Particular examples of aromatic amine antioxidants include, for example, p,p'-dioctyldiphenylamine; t-octylphenyl-α-naphthylamine; phenyl-α-naphthylamine; and p-octylphenyl-α-naphthylamine.

Sulfurized alkyl phenols and alkali or alkaline earth metal salts thereof also are useful antioxidants.

Additional suitable antioxidants include hindered phenols and arylamines. These antioxidants may be used individually by type or in combination with one another.

Detergents

A typical detergent is an anionic material that contains a long chain hydrophobic portion of the molecule and a smaller anionic or oleophobic hydrophilic portion of the molecule. The anionic portion of the detergent is typically derived from an organic acid such as a sulfur acid, carboxylic acid, phosphorous acid, phenol, or mixtures thereof. The counterion is typically an alkaline earth or alkali metal.

Salts that contain a substantially stoichiometric amount of the metal are described as neutral salts and have a total base number (TBN, as measured by ASTM D2896) of from 0 to 80. Many compositions are overbased, containing large amounts of a metal base that is achieved by reacting an excess of a metal compound (a metal hydroxide or oxide, for example) with an acidic gas (such as carbon dioxide). Useful detergents can be neutral, mildly overbased, or highly overbased.

It is desirable for at least some detergent to be overbased. Overbased detergents help neutralize acidic impurities produced by the combustion process and become entrapped in the oil. Typically, the overbased material has a ratio of metallic ion to anionic portion of the detergent of 1.05:1 to 50:1 on an equivalent basis. More preferably, the ratio is from 4:1 to 25:1. The resulting detergent is an overbased detergent that will typically have a total base number (TBN) of 150 or higher, often 250 to 450 or more. Preferably, the overbasing cation is sodium, calcium, or magnesium. A mixture of detergents of differing TBN can be used.

Suitable detergents include, for example, the alkali or alkaline earth metal salts of sulfonates, phenates, carboxylates, phosphates, and salicylates, e.g., a mixture of magnesium sulfonate and calcium salicylate.

Sulfonates may be prepared from sulfonic acids that are typically obtained by sulfonation of alkyl substituted aromatic hydrocarbons. Hydrocarbon examples include, for example, those obtained by alkylating benzene, toluene, xylene, naphthalene, biphenyl and their halogenated derivatives (chlorobenzene, chlorotoluene, and chloronaphthalene, for example). The alkylating agents typically have 3 to 70 carbon atoms. The alkaryl sulfonates typically contain 9 to 80 carbon or more carbon atoms, more typically from 16 to 60 carbon atoms.

Alkaline earth phenates are another useful class of detergent. These detergents can be made by reacting alkaline earth metal hydroxide or oxide ($CaO$, $Ca(OH)_2$, $BaO$, $Ba(OH)_2$, $MgO$, $Mg(OH)_2$, for example) with an alkyl phenol or sulfurized alkylphenol. Useful alkyl groups include straight chain or branched $C_1$-$C_{30}$ alkyl groups, preferably, $C_4$-$C_{20}$. Examples of suitable phenols include, for example, isobutylphenol, 2-ethylhexylphenol, nonylphenol, and dodecyl phenol. Starting alkylphenols may contain more than one alkyl substituent that are each independently straight chain or branched. When a non-sulfurized alkylphenol is used, the sulfurized product may be obtained by methods well known in the art. These methods include, for example, heating a mixture of alkylphenol and sulfurizing agent (including elemental sulfur, sulfur halides such as sulfur dichloride) and then reacting the sulfurized phenol with an alkaline earth metal base.

Metal salts of carboxylic acids are also useful as detergents. These carboxylic acid detergents may be prepared by reacting a basic metal compound with at least one carboxylic acid and removing free water from the reaction product. These compounds may be overbased to produce the desired TBN level. Detergents made from salicylic acid are one preferred class of detergents derived from carboxylic acids. Useful salicylates include, for example, long chain alkyl salicylates. One useful family of compositions is of the formula

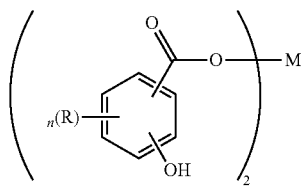

where R is an alkyl group having 1 to 30 carbon atoms, n is an integer from 1 to 4, and M is an alkaline earth metal. Preferred R groups are alkyl chains of at least $C_{11}$, preferably $C_{13}$ or greater. R may be optionally substituted with substituents that do not interfere with the detergent's function. M is preferably, calcium, magnesium, or barium. More preferably, M is calcium.

Hydrocarbyl-substituted salicylic acids may be prepared from phenols by the Kolbe reaction (see U.S. Pat. No. 3,595,791). The metal salts of the hydrocarbyl-substituted salicylic acids may be prepared by double decomposition of a metal salt in a polar solvent such as water or alcohol.

Alkaline earth metal phosphates are also used as detergents and are known in the art.

Detergents may be simple detergents or what is known as hybrid or complex detergents. The latter detergents can provide the properties of two detergents without the need to blend separate materials. See U.S. Pat. No. 6,034,039.

Suitable detergents include, for example, calcium phenates, calcium sulfonates, calcium salicylates, magnesium phenates, magnesium sulfonates, magnesium salicylates and other related components (including borated detergents) in any combination. In one embodiment, the detergent includes magnesium sulfonate and calcium salicylate.

Anti-Wear Additives

A metal alkylthiophosphate, for example, a metal dialkyl dithio phosphate in which the metal constituent is zinc, or zinc dialkyl dithio phosphate (ZDDP) is a suitable anti-wear additive. ZDDP can be primary, secondary or mixtures thereof. ZDDP compounds generally are of the formula $Zn[SP(S)(OR^1)(OR^2)]_2$ where $R^1$ and $R^2$ are $C_1$-$C_{18}$ alkyl groups, preferably $C_2$-$C_{12}$ alkyl groups. These alkyl groups may be straight chain or branched.

Preferable zinc dithiophosphates which are commercially available include secondary zinc dithiophosphates such as those available from, for example, The Lubrizol Corporation under the trade designations "LZ 677A", "LZ 1095" and "LZ 1371", from, for example, Chevron Oronite under the trade designation "OLOA 262" and from, for example, Afton Chemical under the trade designation "HITEC 7169".

Pour Point Depressants (PPDs)

Conventional pour point depressants (also known as lube oil flow improvers)v may be used to lower the minimum temperature at which a lubricating fluid will flow or can be poured. Examples of suitable pour point depressants include, for example, polymethacrylates, polyacrylates, polyarylamides, condensation products of haloparaffin waxes and aromatic compounds, vinyl carboxylate polymers, and terpolymers of dialkylfumarates, vinyl esters of fatty acids and allyl vinyl ethers. See, e.g., U.S. Pat. Nos. 1,815,022, 2,015,748, 2,191,498, 2,387,501, 2,655, 479, 2,666,746; 2,721,877, 2,721,878 and 3,250,715.

Dispersants

During engine operation, oil-insoluble oxidation byproducts are produced. Dispersants help keep these byproducts in solution, thus diminishing their deposition on metal surfaces. Dispersants used in a lubricating oil may be ashless or ash-forming in nature. In one embodiment, the dispersant is ashless. So-called ashless dispersants are organic materials that form substantially no ash upon combustion. For example, non-metal-containing or borated metal-free dispersants are considered ashless. In contrast, metal-containing detergents form ash upon combustion.

Suitable dispersants typically contain a polar group attached to a relatively high molecular weight hydrocarbon chain. The polar group typically contains at least one element of nitrogen, oxygen, or phosphorus. Typical hydrocarbon chains contain 50 to 400 carbon atoms.

Chemically, many dispersants may be characterized as phenates, sulfonates, sulfurized phenates, salicylates, naphthenates, stearates, carbamates, thiocarbamates, phosphorus derivatives. One useful class of dispersants are the alkenyl-succinic derivatives, typically produced by the reaction of a long chain hydrocarbyl substituted succinic compound, usually a hydrocarbyl substituted succinic anhydride, with a polyhydroxy or polyamino compound. The long chain hydrocarbyl group constituting the oleophilic portion of the molecule which confers solubility in the oil, is normally a polyisobutylene group. Many examples of this type of dispersant are well known commercially and in the literature. See, e.g., U.S. Pat. Nos. 3,172,892; 3,215,707; 3,219, 666; 3,316,177; 3,341,542; 3,444,170; 3,454,607; 3,541, 012; 3,630,904; 3,632,511; 3,787,374 and 4,234,435. Other types of dispersant are described in U.S. Pat. Nos. 3,036, 003; 3,200,107; 3,254,025; 3,275,554; 3,438,757; 3,454, 555; 3,565,804; 3,413,347; 3,697,574; 3,725,277; 3,725, 480; 3,726,882; 4,454,059; 3,329,658; 3,449,250; 3,519, 565; 3,666,730; 3,687,849; 3,702,300; 4,100,082; 5,705, 458. A further description of dispersants may be found, for example, in European Patent Application No. 471 071.

Hydrocarbyl-substituted succinic acid and hydrocarbyl-substituted succinic anhydride derivatives are useful dispersants. In particular, succinimide, succinate esters, or succinate ester amides prepared by the reaction of a hydrocarbon-substituted succinic acid compound preferably having at least 50 carbon atoms in the hydrocarbon substituent, with at least one equivalent of an alkylene amine are particularly useful.

Succinimides are formed by the condensation reaction between hydrocarbyl substituted succinic anhydrides and amines. Molar ratios can vary depending on the polyamine. For example, the molar ratio of hydrocarbyl substituted succinic anhydride to TEPA can vary from 1:1 to 5:1. Representative examples are shown in U.S. Pat. Nos. 3,087,936; 3,172,892; 3,219,666; 3,272,746; 3,322,670; and U.S. Pat. Nos. 3,652,616, 3,948,800; and Canadian Patent No. 1,094,044.

Succinate esters are formed by the condensation reaction between hydrocarbyl substituted succinic anhydrides and alcohols or polyols. Molar ratios can vary depending on the alcohol or polyol used. For example, the condensation product of a hydrocarbyl substituted succinic anhydride and pentaerythritol is a useful dispersant.

Succinate ester amides are formed by condensation reaction between hydrocarbyl substituted succinic anhydrides and alkanol amines. For example, suitable alkanol amines include ethoxylated polyalkylpolyamines, propoxylated polyalkylpolyamines and polyalkenylpolyamines such as polyethylene polyamines. One example is propoxylated hexamethylenediamine. See U.S. Pat. No. 4,426,305.

The molecular weight of the hydrocarbyl substituted succinic anhydrides used in the preceding paragraphs will typically range between 800 and 2,500. The above products can be post-reacted with various reagents such as sulfur, oxygen, formaldehyde, carboxylic acids such as oleic acid. The above products can also be post reacted with boron compounds such as boric acid, borate esters or highly borated dispersants, to form borated dispersants generally having from 0.1 to 5 moles of boron per mole of dispersant reaction product.

Mannich base dispersants are made from the reaction of alkylphenols, formaldehyde, and amities. See U.S. Pat. No. 4,767,551. Process aids and catalysts, such as oleic acid and sulfonic acids, can also be part of the reaction mixture. Molecular weights of the alkylphenols range from 800 to 2,500. See, e.g., U.S. Pat. Nos. 3,697,574; 3,703,536; 3,704,308; 3,751,365; 3,756,953; 3,798,165; and 3,803,039.

Typical high molecular weight aliphatic acid modified Mannich condensation products useful in this disclosure can be prepared from high molecular weight alkyl-substituted hydroxyaromatics or $HN^{TM}_2$ group-containing reactants.

Hydrocarbyl substituted amine ashless dispersant additives are well known to one skilled in the art. See, for example, U.S. Pat. Nos. 3,275,554; 3,438,757; 3,565,804; 3,755,433, 3,822,209, and 5,084,197.

Suitable dispersants include, for example, borated and non-borated succinimides, including those derivatives from mono-succinimides, bis-succinimides, and/or mixtures of mono- and bis-succinimides, wherein the hydrocarbyl succinimide is derived from a hydrocarbylene group such as polyisobutylene having a molecular weight ($M_n$) of from 500 to 5000 or a mixture of such hydrocarbylene groups. Additional dispersants include succinic acid-esters and amides, alkylphenol-polyamine-coupled Mannich adducts, their capped derivatives, and other related components. One dispersant is polyisobutylene succinimide polyamine (PIBSA-PAM).

Seal Compatibility Agents

Seal compatibility agents help to swell elastomeric seals by causing a chemical reaction in the fluid or physical change in the elastomer. Suitable seal compatibility agents include, for example, organic phosphates, aromatic esters, aromatic hydrocarbons, esters (butylbenzyl phthalate, for example), and polybutenyl succinic anhydride.

Antifoam Agents

Anti-foam agents may advantageously be added to lubricant compositions. These agents retard the formation of stable foams. Silicones and organic polymers are typical anti-foam agents. For example, polysiloxanes, such as silicon oil or polydimethyl siloxane, provide antifoam properties. Anti-foam agents are commercially available and may be used in conventional amounts along with other additives such as demulsifiers.

Viscosity Index Improvers

Viscosity index improvers (also known as VI improvers, viscosity modifiers, and viscosity improvers) can be included in lubricant compositions. Viscosity index improvers provide lubricants with high and low temperature operability. These additives impart shear stability at elevated temperatures and acceptable viscosity at low temperatures.

Suitable viscosity index improvers include, for example, high molecular weight hydrocarbons, polyesters and viscosity index improver dispersants that function as both a viscosity index improver and a dispersant. Typical molecular weights of these polymers are between 10,000 to 1,500,000, more typically 20,000 to 1,200,000, and even more typically between 50,000 and 1,000,000.

Examples of suitable viscosity index improvers include, for example, linear or star-shaped polymers and copolymers of methacrylate, butadiene, olefins, or alkylated styrenes. Polyisobutylene is a commonly used viscosity index improver. Another suitable viscosity index improver is polymethacrylates (copolymers of various chain length alkyl methacrylates, for example), some formulations of which also serve as pour point depressants. Other suitable viscosity index improvers include, for example, copolymers of ethylene and propylene, hydrogenated block copolymers of styrene and isoprene, and polyacrylates (copolymers of various chain length acrylates, for example). Specific examples include styrene-isoprene or styrene-butadiene based polymers of 50,000 to 200,000 molecular weight.

Olefin copolymers, are commercially available from Chevron Oronite Company LLC under the trade designation "PARATONE®" (such as "PARATONE® 8921" and "PARATONE® 8941"); from Afton Chemical Corporation under the trade designation "HiTEC®" (such as "HiTEC® 5850B"; and from The Lubrizol Corporation under the trade designation "Lubrizol 7067C". Polyisoprene polymers are commercially available from Infineum International Limited, e.g. under the trade designation "SV200"; diene-styrene copolymers are commercially available from Infineum International Limited, e.g. under the trade designation "SV 260".

Suitable corrosion inhibitors, rust inhibitors, high base materials, reparative agents, heat transfer agents, surface reactivity control agents, surface deactivators, acid neutralizing agents, lubricant film enhancers, and smart viscosity modifiers for use in the present invention are known to those skilled in the art. See, e.g., Klamann, *Lubricants and Related Products: Synthesis, Properties, Applications, International Standards*, March 1984.

In one embodiment, the amount of chemical additive present in the microcapsules prepared as described herein is from about 0.1 to about 10 wt. %, such as from about 0.1 to about 5 wt. %, from about 0.5 to about 2.5 wt. %, from about 0.75 to about 2.5 wt. %, from about 1 to about 2.5 wt. % or from about 1 to about 2 wt. %. In one embodiment, the amount of chemical additive present in the microcapsules is about 1 wt. % when the microcapsules are added to a lubricant. In one embodiment, the amount of additive present in the microcapsules is about 2 wt. % when the microcapsules are added to a lubricant Lubricants In another aspect the present invention relates to a lubricant comprising a microcapsule according to any of the embodiments described herein.

Lubricant Oil Base Stocks

A wide range of lubricating base oils is known in the art. Lubricating base oils that are useful include both natural oils, and synthetic oils, and unconventional oils (or mixtures thereof can be used unrefined, refined, or rerefined (the latter is also known as reclaimed or reprocessed oil). Unrefined oils are those obtained directly from a natural or synthetic source and used without added purification. These include shale oil obtained directly from retorting operations, petroleum oil obtained directly from primary distillation, and ester oil obtained directly from an esterification process. Refined oils are similar to the oils discussed for unrefined oils except refined oils are subjected to one or more purification steps to improve at least one lubricating oil property. One skilled in the art is familiar with many purification processes. These processes include solvent extraction, secondary distillation, acid extraction, base extraction, filtration, and percolation. Rerefined oils are obtained by processes analogous to refined oils but using an oil that has been previously used as a feed stock.

Groups I, II, III, IV and V are broad base oil stock categories developed and defined by the American Petroleum Institute (API Publication 1509; www.API.org) to create guidelines for lubricant base oils. Group I base stocks have a viscosity index of between 80 to 120 and contain greater than 0.03% sulfur and/or less than 90% saturates. Group II base stocks have a viscosity index of between 80 to 120, and contain less than or equal to 0.03% sulfur and greater than or equal to 90% saturates. Group III stocks have a viscosity index greater than 120 and contain less than or equal to 0.03% sulfur and greater than 90% saturates. Group IV includes polyalphaolefins (PAO). Group V base stock includes base stocks not included in Groups I-IV. The table below summarizes properties of each of these five groups.

| Base Oil Properties | | | |
|---|---|---|---|
| | Saturates | Sulfur | Viscosity Index |
| Group I | <90 and/or | >0.03% and | ≥80 and <120 |
| Group II | ≥90 and | ≤0.03% and | ≥80 and <120 |
| Group III | ≥90 and | ≤0.03% and | ≥120 |
| Group IV | Includes polyalphaolefins (PAO) and GTL products | | |
| Group V | All other base oil stocks not includes in Groups I, II, III or IV | | |

Natural oils include animal oils, vegetable oils (castor oil and lard oil, for example), and mineral oils. Animal and vegetable oils possessing favorable thermal oxidative stability can be used. Of the natural oils, mineral oils are preferred. Mineral oils vary widely as to their crude source, for example, as to whether they are paraffinic, naphthenic, or mixed paraffinic-naphthenic. Oils derived from coal or shale are also useful. Natural oils vary also as to the method used for their production and purification, for example, their distillation range and whether they are straight run or cracked, hydrorefined, or solvent extracted.

Group II and/or Group III hydroprocessed or hydrocracked basestocks, including synthetic oils such as polyalphaolefins, alkyl aromatics and synthetic esters are also well known basestock oils.

Synthetic oils include hydrocarbon oil. Hydrocarbon oils include oils such as polymerized and interpolymerized olefins (polybutylenes, polypropylenes, propylene isobutylene copolymers, ethylene-olefin copolymers, and ethylene-alphaolefin copolymers, for example). Polyalphaolefin (PAO) oil base stocks are commonly used synthetic hydrocarbon oil. By way of example, PAOs derived from $C_8$, $C_{10}$, $C_{12}$, $C_{14}$ olefins or mixtures thereof may be utilized. See U.S. Pat. Nos. 4,956,122; 4,827,064; and 4,827,073.

The number average molecular weights of the PAOs, which are known materials and generally available on a major commercial scale from suppliers such as ExxonMobil Chemical Company, Chevron Phillips Chemical Company, British Petroleum, and others, typically vary from 250 to 3,000, although PAO's may be made in viscosities up to 100 cSt (100° C.). The PAOs are typically comprised of relatively low molecular weight hydrogenated polymers or oligomers of alphaolefins which include, but are not limited to, $C_2$ to $C_{32}$ alphaolefins with the $C_8$ to $C_{16}$ alphaolefins, such as 1-octene, 1-decene, 1-dodecene and the like, being preferred. The preferred polyalphaolefins are poly-1-octene, poly-1-decene and poly-1-dodecene and mixtures thereof and mixed olefin-derived polyolefins. However, the dimers of higher olefins in the range of $C_{14}$ to $C_{18}$ may be used to provide low viscosity basestocks of acceptably low volatility. Depending on the viscosity grade and the starting oligomer, the PAOs may be predominantly trimers and tetramers of the starting olefins, with minor amounts of the higher oligomers, having a viscosity range of 1.5 to 12 cSt.

The PAO fluids may be conveniently made by the polymerization of an alphaolefin in the presence of a polymerization catalyst such as the Friedel-Crafts catalysts including, for example, aluminum trichloride, boron trifluoride or complexes of boron trifluoride with water, alcohols such as ethanol, propanol or butanol, carboxylic acids or esters such as ethyl acetate or ethyl propionate. See, e.g., U.S. Pat. Nos. 4,149,178 and 3,382,291. Other descriptions of PAO synthesis may be found in U.S. Pat. Nos. 3,742,082; 3,769,363; 3,876,720; 4,239,930; 4,367,352; 4,413,156; 4,434,408; 4,910,355; 4,956,122; and 5,068,487. The dimers of the $C_{14}$ to $C_{18}$ olefins are described in U.S. Pat. No. 4,218,330.

The hydrocarbyl aromatics can be used as base oil or base oil component and can be any hydrocarbyl molecule that contains at least 5% of its weight derived from an aromatic moiety such as a benzenoid moiety or naphthenoid moiety, or their derivatives. These hydrocarbyl aromatics include alkyl benzenes, alkyl naphthalenes, alkyl diphenyl oxides, alkyl naphthols, alkyl diphenyl sulfides, alkylated bis-phenol A, alkylated thiodiphenol, and the like. The aromatic can be mono-alkylated, dialkylated, polyalkylated, and the like. The aromatic can be mono- or poly-functionalized. The hydrocarbyl groups can also be comprised of mixtures of alkyl groups, alkenyl groups, cycloalkyl groups, cycloalkenyl groups and other related hydrocarbyl groups. The hydrocarbyl groups can range from $C_6$ up to $C_{60}$ with a range of $C_8$ to $C_{20}$ often being preferred. A mixture of hydrocarbyl groups is often preferred, and up to three such substituents may be present. The hydrocarbyl group can optionally contain sulfur, oxygen, and/or nitrogen containing substituents. The aromatic group can also be derived from natural (petroleum) sources, provided at least 5% of the molecule is comprised of an above-type aromatic moiety. Viscosities at 100° C. of approximately 3 cSt to 50 cSt are preferred, with viscosities of approximately 14 cSt to 20 cSt often being more to preferred for the hydrocarbyl aromatic component. In one embodiment, an alkyl naphthalene where the alkyl group is primarily comprised of 1-hexadecene is used. Other alkylates of aromatics can be advantageously used. Naphthalene or methyl naphthalene, for example, can be alkylated with olefins such as octene, decene, dodecene, tetradecene or higher, mixtures of similar olefins, and the like. Useful concentrations of hydrocarbyl aromatic in a lubricant oil composition can be 2% to 25%, preferably 4% to 20%, and more preferably 4% to 15%, depending on the application.

Esters comprise a useful base stock. Additive solvency and seal compatibility characteristics may be secured by the use of esters such as the esters of dibasic acids with monoalkanols and the polyol esters of monocarboxylic acids. Esters of the former type include, for example, the esters of dicarboxylic acids such as phthalic acid, succinic acid, alkyl succinic acid, alkenyl succinic acid, maleic acid, azelaic acid, suberic acid, sebacic acid, fumaric acid, adipic acid, linoleic acid dimer, malonic acid, alkyl malonic acid, alkenyl malonic acid, etc., with a variety of alcohols such as butyl alcohol, hexyl alcohol, dodecyl alcohol, 2-ethylhexyl alcohol, etc. Specific examples of these types of esters include t-butyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, etc.

Additional useful synthetic esters are those which are obtained by reacting one or more polyhydric alcohols, preferably the hindered polyols (such as the neopentyl polyols, e.g., neopentyl glycol, trimethylol ethane, 2-methyl-2-propyl-1,3-propanediol, trimethylol propane, pentaerythritol and dipentaerythritol) with alkanoic acids containing at least 4 carbon atoms, preferably $C_5$ to $C_{30}$ acids such as saturated straight chain fatty acids including caprylic acid, capric acid, lauric acid, myristic acid, palmitic acid, stearic acid, arachic acid, and behenic acid, or the corresponding branched chain fatty acids or unsaturated fatty acids such as oleic acid, or mixtures of any of these materials.

Suitable synthetic ester components include the esters of trimethylol propane, trimethylol butane, trimethylol ethane, pentaerythritol and/or dipentaerythritol with one or more monocarboxylic acids containing from 5 to 10 carbon atoms. These esters are widely available commercially, for example, the Mobil P-41 and P-51 esters of ExxonMobil Chemical Company).

Other useful fluids of lubricating viscosity include non-conventional or unconventional base stocks that have been processed, preferably catalytically, or synthesized to provide high performance lubrication characteristics.

Non-conventional or unconventional base stocks/base oils include one or more of a mixture of base stock(s) derived from one or more Gas-to-Liquids (GTL) materials, as well as isomerate/isodewaxate base stock(s) derived from natural wax or waxy feeds, mineral and or non-mineral oil waxy feed stocks such as slack waxes, natural waxes, and waxy stocks such as gas oils, waxy fuels hydrocracker bottoms, waxy raffinate, hydrocrackate, thermal crackates, or other mineral, mineral oil, or even non-petroleum oil derived waxy materials such as waxy materials received from coal liquefaction or shale oil, and mixtures of such base stocks.

GTL materials are materials that are derived via one or more synthesis, combination, transformation, rearrangement, and/or degradation/deconstructive processes from gaseous carbon-containing compounds, hydrogen-containing compounds and/or elements as feed stocks such as hydrogen, carbon dioxide, carbon monoxide, water, methane, ethane, ethylene, acetylene, propane, propylene, propyne, butane, butylenes, and butynes. GTL base stocks and/or base oils are GTL materials of lubricating viscosity that are generally derived from hydrocarbons; for example, waxy synthesized hydrocarbons, that are themselves derived from simpler gaseous carbon-containing compounds, hydrogen-containing compounds and/or elements as feed stocks. GTL base stock(s) and/or base oil(s) include oils boiling in the lube oil boiling range (1) separated/fractionated from synthesized GTL materials such as, for example, by distillation and subsequently subjected to a final wax processing step which involves either or both of a catalytic dewaxing process, or a solvent dewaxing process, to produce tube oils of reduced/low pour point; (2) synthesized wax isomerates, comprising, for example, hydrodewaxed or hydroisomerized cat and/or solvent dewaxed synthesized wax or waxy hydrocarbons; (3) hydrodewaxed or hydroisomerized cat and/or solvent dewaxed Fischer-Tropsch (F-T) material (i.e., hydrocarbons, waxy hydrocarbons, waxes and possible analogous oxygenates); preferably hydrodewaxed or to hydroisomerized/followed by cat and/or solvent dewaxing dewaxed F-T waxy hydrocarbons, or hydrodewaxed or hydroisomerized/followed by cat (or solvent) dewaxing dewaxed, F-T waxes, or mixtures thereof.

GTL base stock(s) and/or base oil(s) derived from GTL materials, especially, hydrodewaxed or hydroisomerized/followed by cat and/or solvent dewaxed wax or waxy feed, preferably FT material derived base stock(s) and/or base oil(s), are characterized typically as having kinematic viscosities at 100° C. of from 2 $mm^2/s$ to 50 $mm^2/s$ (ASTM D445). They are further characterized typically as having pour points of −5° C. to −40° C. or lower (ASTM D97). They are also characterized typically as having viscosity indices of 80 to 140 or greater (ASTM D2270).

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) typically have very low sulfur and nitrogen content, generally containing less than 10 ppm, and more typically less than 5 ppm of each of these elements. The sulfur and nitrogen content of GTL base stock(s) and/or base oil(s) obtained from F-T material, especially F-T wax, is essentially nil. In addition, the absence of phosphorous and aromatics make this materially especially suitable for the formulation of low SAP products.

The term GTL base stock and/or base oil and/or wax isomerate base stock and/or base oil is to be understood as embracing individual fractions of such materials of wide viscosity range as recovered in the production process, mixtures of two or more of such fractions, as well as mixtures of one or two or more low viscosity fractions with one, two or more higher viscosity fractions to produce a blend wherein the blend exhibits a target kinematic viscosity.

The GTL material, from which the GTL base stock(s) and/or base oil(s) is/are derived may be an F-T material (i.e., hydrocarbons, waxy hydrocarbons, wax).

In addition, the GTL base stock(s) and/or base oil(s) are typically highly paraffinic (>90% saturates), and may contain mixtures of monocycloparaffins and multicycloparaffins in combination with non-cyclic isoparaffins. The ratio of the naphthenic (i.e., cycloparaffin) content in such combinations varies with the catalyst and temperature used. Further, GTL base stock(s) and/or base oil(s) and hydrodewaxed, or hydroisomerized/cat (and/or solvent) dewaxed base stock(s) and/or base oil(s) typically have very low sulfur and nitrogen content, generally containing less than 10 ppm, and more typically less than 5 ppm of each of these elements. The sulfur and nitrogen content of GTL base stock(s) and/or base oil(s) obtained from F-T material, especially F-T wax, is essentially nil. In addition, the absence of phosphorous and aromatics make this material especially suitable for the formulation of low sulfur, sulfated ash, and phosphorus (low SAP) products.

Base oils for use in the formulated lubricating oils include any of the variety of oils corresponding to API Group I, Group II, Group III, Group IV, and Group V oils and mixtures thereof, preferably API Group II, Group III, Group IV, and Group V oils and mixtures thereof, more preferably the Group III to Group V base oils due to their exceptional volatility, stability, viscometric and cleanliness features. Minor quantities of Group I stock, such as the amount used to dilute additives for blending into formulated lube oil products, can be tolerated but should be kept to a minimum, i.e. amounts only associated with their use as diluents/carrier oil for additives used on an "as-received" basis. Even in regard to the Group II stocks, it is preferred that the Group II stock be in the higher quality range associated with that stock, i.e. a Group II stock having a viscosity index in the range 100<VI<120.

The base oil typically constitutes the major component of an engine oil lubricant composition and is typically is present in an amount ranging from 50 to 99 weight percent, preferably from 70 to 95 weight percent, and more preferably from 85 to 95 weight percent, based on the total weight of the composition. The base oil may be selected from any of the synthetic or natural oils typically used as crankcase lubricating oils for spark-ignited and compression-ignited engines. The base oil conveniently has a kinematic viscosity, according to ASTM standards, of 2.5 cSt to 12 cSt (or $mm^2/s$) at 100° C. and preferably of 2.5 cSt to 9 cSt (or mm.sup.2/s) at 100.degree. C. Mixtures of synthetic and natural base oils may be used if desired.

The types and quantities of lubricant additives are not limited by the examples shown herein as illustrations.

When lubricating oil compositions contain microcapsules comprising one or more of the chemical additives discussed above, the additive(s) are blended into the composition in an amount sufficient for it to perform its intended function.

The following examples serve the purpose of illustrating the invention and are not intended to limiting the scope of the present invention.

EXAMPLE 1

Preparation of Poly(Urea-Formaldehyde) (PUF) Microcapsules

One-Step Method

At room temperature, 250 ml of deionized water and emulsifiers were mixed in a 1000 ml flask. The flask was then suspended in a temperature-controlled water bath on a programmable hotplate with external temperature probe. The solution was agitated at 500-1000 rpm, 5.00 g of urea, and 0.50 g ammonium chloride and 0.50 g of resorcinol were dissolved in the solution. The pH was then adjusted to 3.0-3.5. Then 15-25 mL of the target antioxidant was added slowly to form an emulsion and allowed to stabilize for 30 minutes. After stabilization, 12.7 g of 37 wt % aqueous solution of formaldehyde was added to obtain a 1:1.9 molar ratio of formaldehyde to urea. The emulsion was heated at a rate of 1° C. $min^{-1}$ to a target temperature of 55-65° C. After 3 to 5 hours, the solution was allowed to cool to ambient temperature with stirring. The suspension of microcapsules thus formed was isolated by filtration. The microcapsules were then rinsed with deionized water, acetone and hexane, respectively, and air dried for 24-48 hours.

Two-Step Method

1) Preparation of Prepolymer

A mixture of 8.0 g of urea and 18.9 g formaldehyde (37%) was added to a 50 ml round-bottomed flask. The pH of the solution was adjusted to 8-9. The flask was then heated to 70° C. and stirred at 500 rpm for 1 to 1.5 hours to afford a water-soluble viscous liquid of a linear formalin/urea prepolymer.

(2) Encapsulation

A mixture of 10.0 g of oily chemical additive and 200 mL of deionized water with an emulsifier was agitated in a 1000 ml flask at 800 to 1200 rpm. Then, the prepared pre-polymer from step 1) was added and the chemical additive was emulsified and dispersed in the solution under agitation. Citric acid was then added to the dispersion to reduce the pH to between 2.5 and 4. The dispersion was then agitated for about 3-4 hours at a temperature of between 55 and 70° C. The microcapsules thus formed were separated by filtration, washed thoroughly with distilled water to remove unreacted monomer and chemical additive, then dried at 50° C. in an oven for 24 hours.

EXAMPLE 2

Preparation of Poly(Melamine-Formaldehyde) (PMF) Microcapsules (1) Water Phase Formation 200 ml of deionized water and emulsifier were mixed in a 1000 ml three-necked round-bottomed flask at 45 to 55° C.

(2) Oil Phase Formation 8.0 g PMF prepolymer was mixed with 30-40 g toluene to form a clear solution. Co-solvents (such as ethanol, isopropanol or THF) was also added. 20 g of core material additive was then added and the mixture was stirred at 30-40° C. for 1 hour under an atmosphere of nitrogen to form the oil phase.

(3) Oil in Water Emulsion Formation

The oil phase prepared in step 2) was added drop-wise to the stirred (500-1000 rpm) water phase prepared in step 1) at room temperature to form an oil in water emulsion, which was allowed to stabilize for 30 minutes.

(4) Polymerization

After stabilization, 6 mL $H_2SO_4$ (3 molar) was then added to the emulsion. The emulsion was then covered, blanketed under a nitrogen atmosphere and heated to 60-70° C. After 3-5 hours, the solution was allowed to cool with stirring to ambient temperature. The resulting suspension of microcapsules was then isolated by filtration. The microcapsules were rinsed with deionized water then air dried for 24-48 hours.

EXAMPLE 3

Internal Phase-Separation Encapsulation (1) Water Phase Preparation

Deionized water and emulsifiers were mixed in a 1000 mL three-necked round-bottomed flask at 35 to 40° C.

(2) Oil Phase Formation

PMMA or polystyrene was mixed with a solvent to form a clear solution. The core material additive (encapsulate) was then added and the resulting mixture was stirred for 30 minutes at 30 to 40° C. to form the oil phase.

(3) Oil/Water Emulsion Formation and Polymerization

The water phase prepared in step 1) was agitated with a digital mixer at 500-1000 rpm at room temperature. The oil phase containing both the core material additive (encapsulate) and the polymer prepared in step 2) was then added to the water phase to form an emulsion and allowed to stabilize for 30 minutes. The mixture was then heated at a rate of 1° C. $min^{-1}$ to a target temperature of 60° C. After 4-6 hours, the reaction was complete. The resulting suspension of microcapsules was then separated under vacuum with suction filtration. The microcapsules were rinsed with deionized water and then air dried.

EXAMPLE 4

Microencapsulation of Polar Long Chain Molecules

Deionized water and emulsifiers were mixed in a 1000 ml three-necked round-bottomed flask at 30 to 70° C. (dependent on the properties of the capsulate). The water phase was agitated with a digital mixer at 500-1000 rpm, then the core material additive (encapsulate) was added to the water phase to form an emulsion and allowed to stabilize for 30 minutes. The emulsion was then mixed with PMF prepolymer and stirred for 1-2 hours. The temperature was then raised to 60° C. until microcapsules formed. The microcapsules were then separated under vacuum with suction filtration, rinsed with deionized water and then air dried for 24-48 hours.
Figures FIG. 1 shows a scanning electron microscope (SEM) image of poly(urea-formaldehyde) (PUF) microcapsules prepared according to the present invention.

Figure 2:
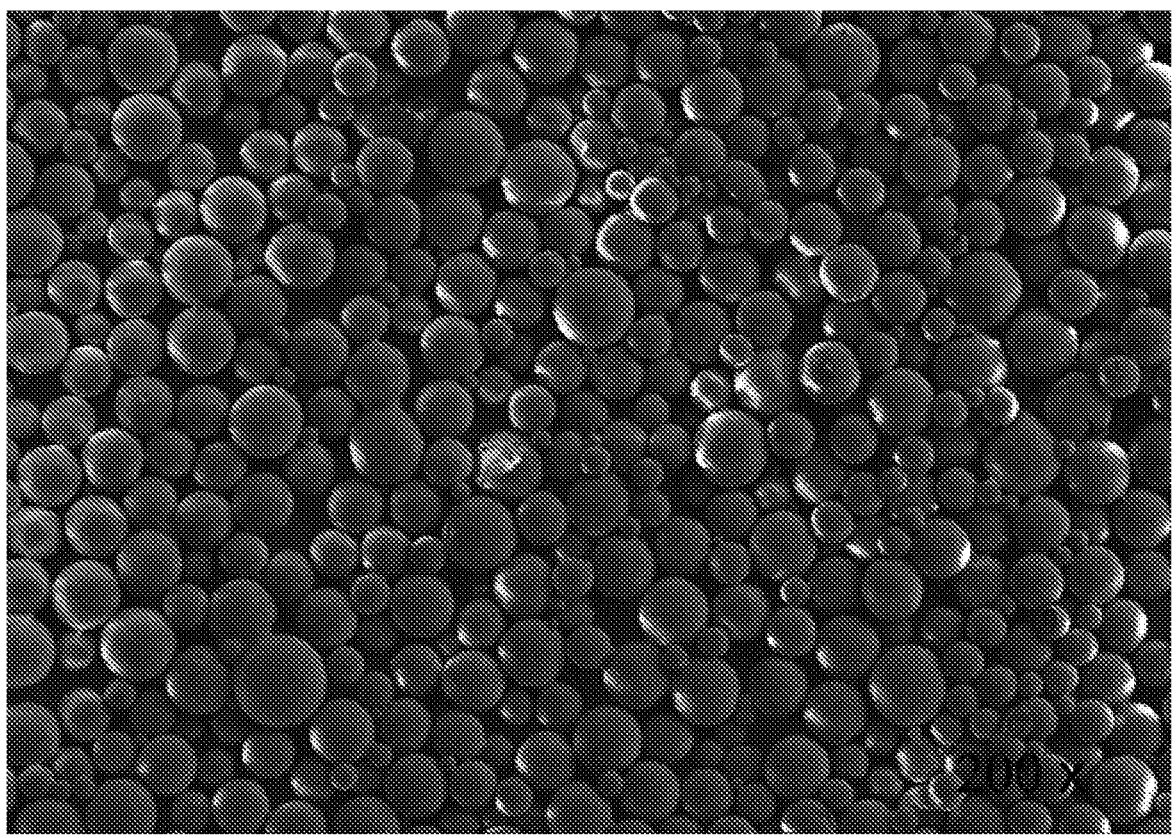
FIG. 2 shows a scanning electron microscope (SEM) image of polymethylmacrylic acid (PMMA) microcapsules prepared according to the present invention.

FIG. 2 shows a scanning electron microscope (SEM) image of polymethylmacrylic acid (PMMA) microcapsules prepared according to the present invention.

Figure 3:
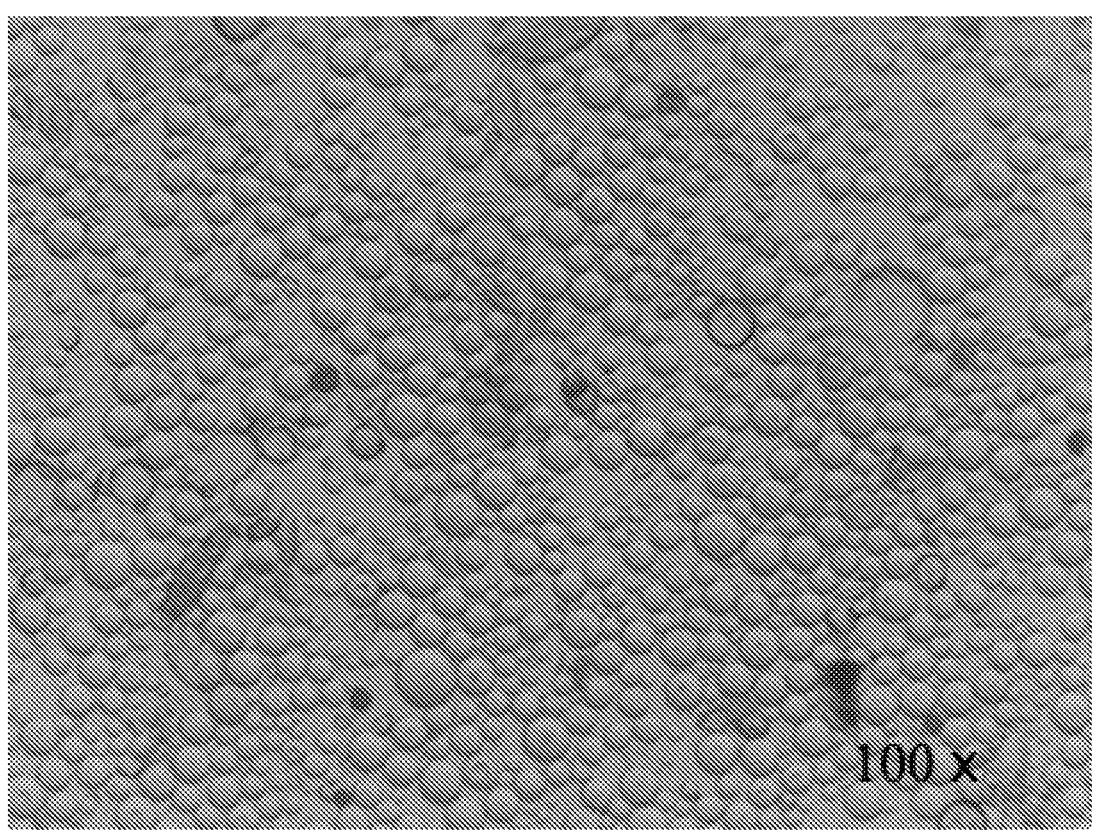
FIG. 3 shows an optical micrograph image of polymethylmacrylic acid (PMMA) microcapsules prepared according to the present invention.

FIG. 3 shows an optical micrograph image of polymethylmacrylic acid (PMMA) microcapsules prepared according to the present invention.

Figure 4A:
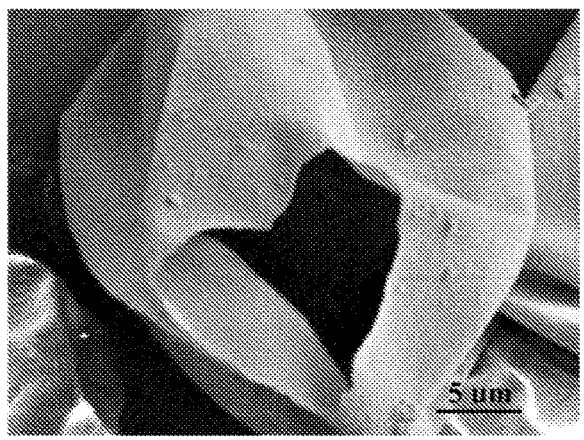
FIGS. 4A, 4B and 4C show SEM micrographs of microcapsules with different shell thicknesses prepared according to the present invention.
Figure 4B:
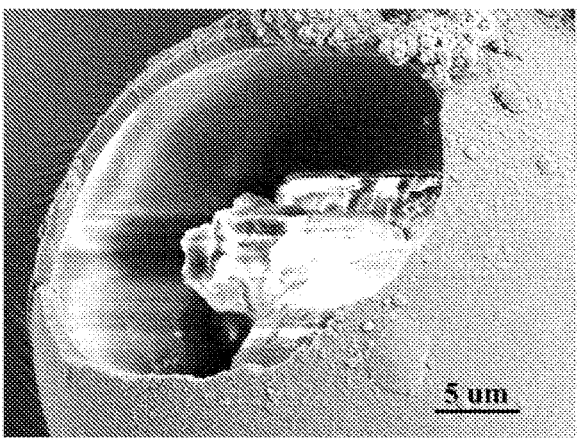
Figure 4C:
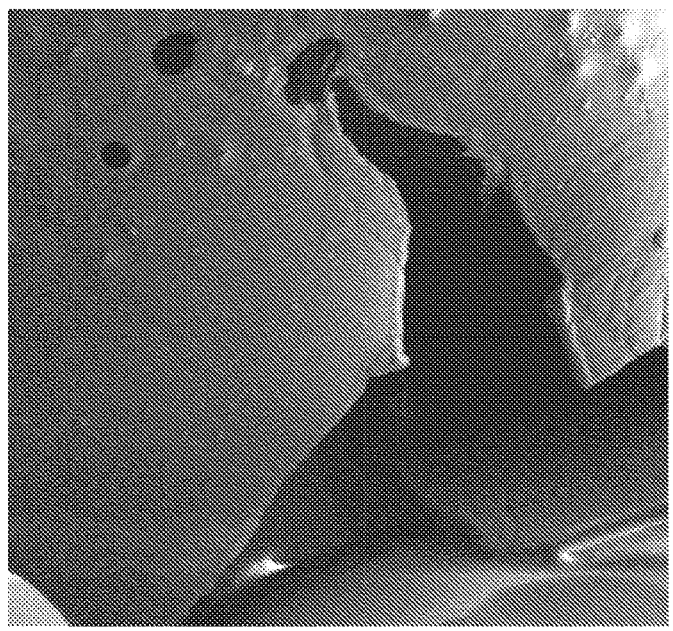

FIGS. 4A, 4B and 4C show SEM micrographs of microcapsules with different shell thicknesses prepared according to the present invention.

Figure 4D:
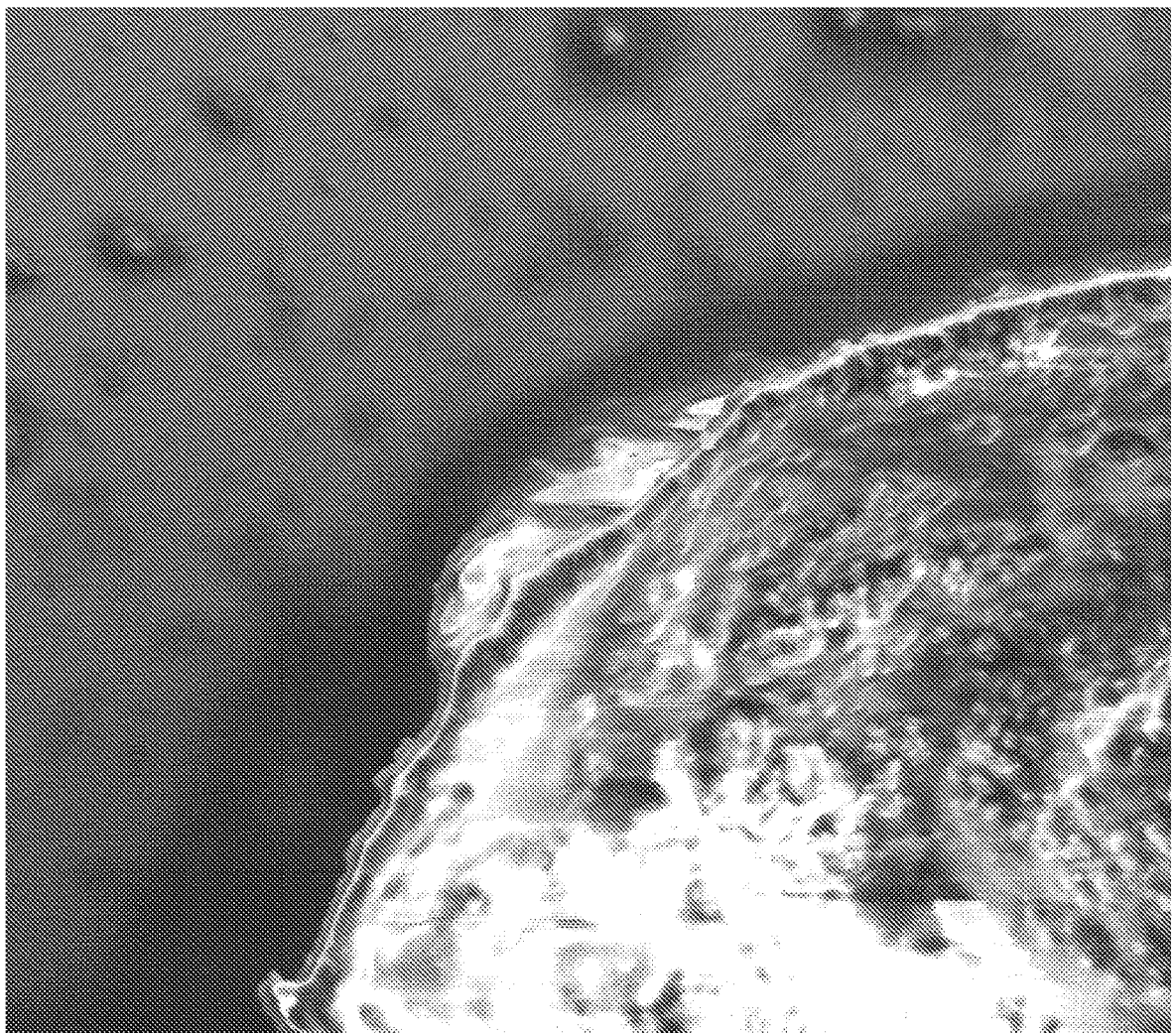
FIG. 4D shows an SEM micrograph of microcapsules having a shell thickness of about 0.45 microns prepared according to the present invention.

FIG. 4D shows an SEM micrograph of microcapsules having a shell thickness of about 0.45 microns prepared according to the present invention.

Figure 5A:
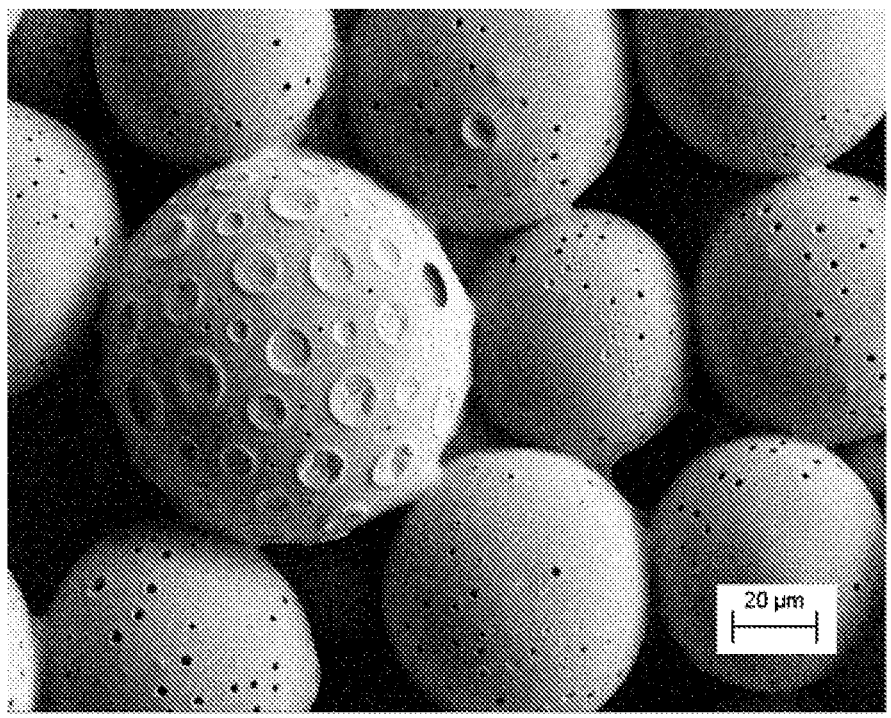
FIGS. 5A and 5B show microcapsules prepared according to the present invention containing porosity/holes to enable gradual release of the encapsulated chemical additive over time.
Figure 5B:
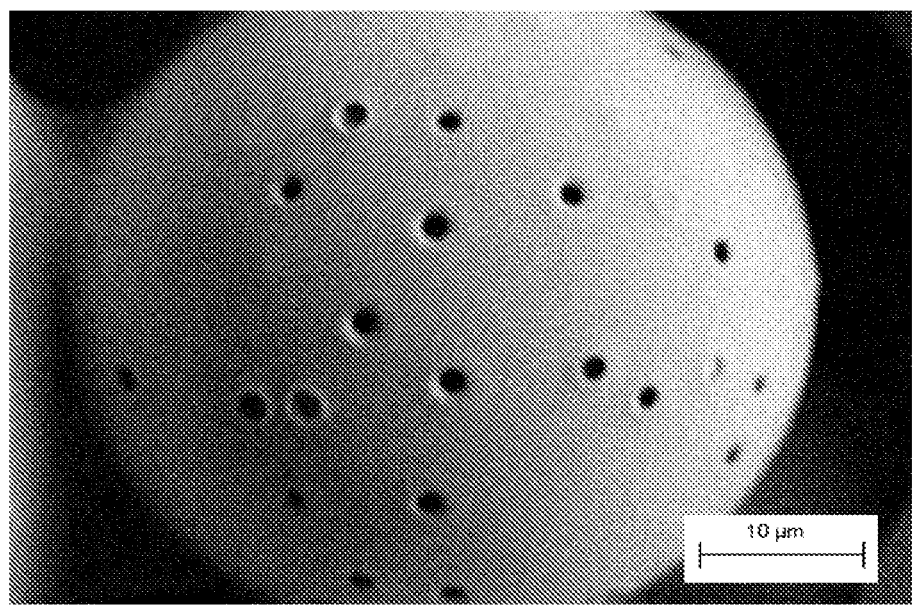

FIGS. 5A and 5B shows microcapsules of containing porosity/holes to enable gradual release of the encapsulated chemical additive over time.

Figure 6:
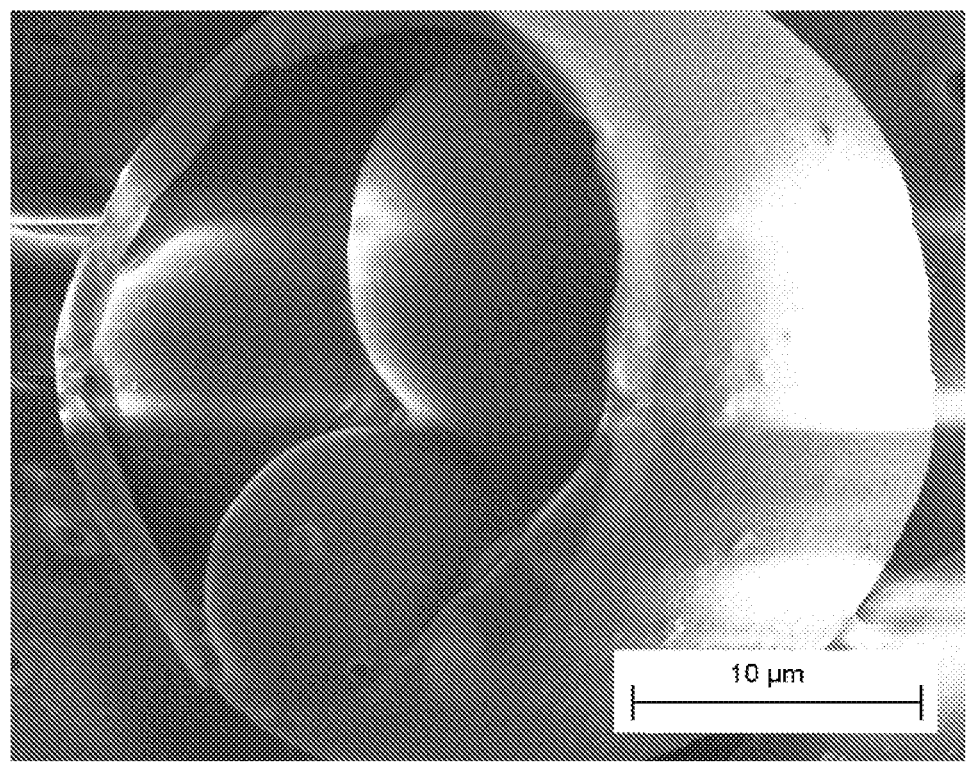
FIG. 6 shows microcapsules within a capsule prepared according to the present invention.

FIG. 6 shows microcapsules within a capsule prepared according to the present invention.

Figure 7A:
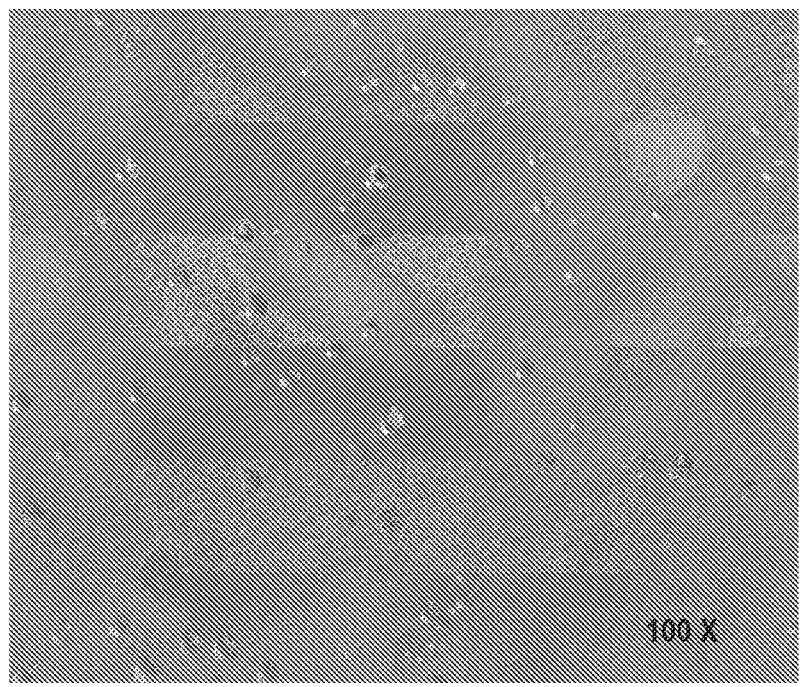
FIG. 7A shows microcapsules prepared according to the present invention dispersed within oil.

FIG. 7A shows microcapsules prepared according to the present invention dispersed within oil.

Figure 7B:
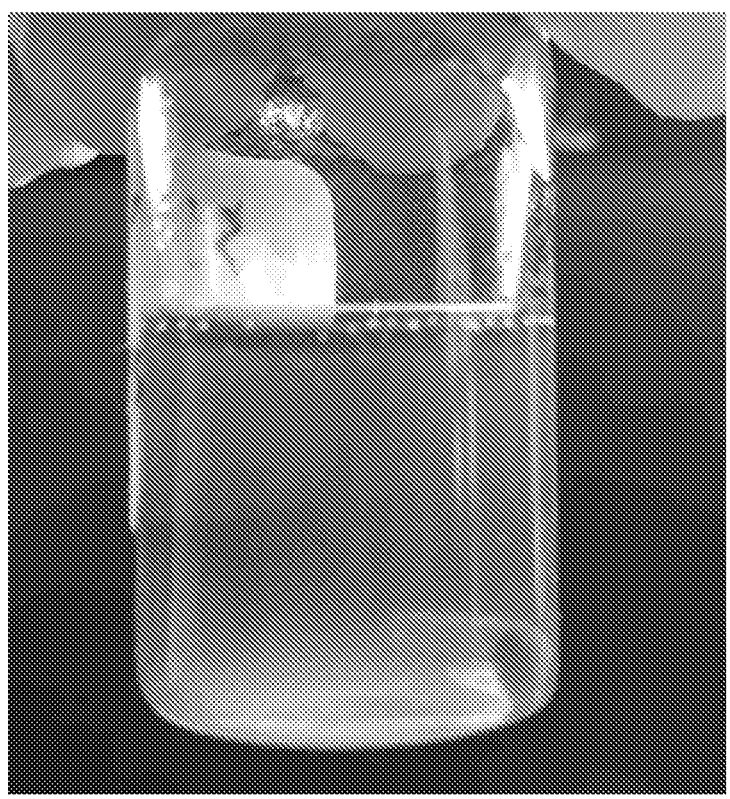
FIG. 7B shows a solution of microcapsules prepared according to the present invention dispersed within oil containing a cationic dispersant.

FIG. 7B shows a solution of microcapsules prepared according to the present invention dispersed within oil containing a cationic dispersant.

EXAMPLE 5

Examination of the Shear Stability of Color Pigment Encapsulated Capsules

Figure 8:
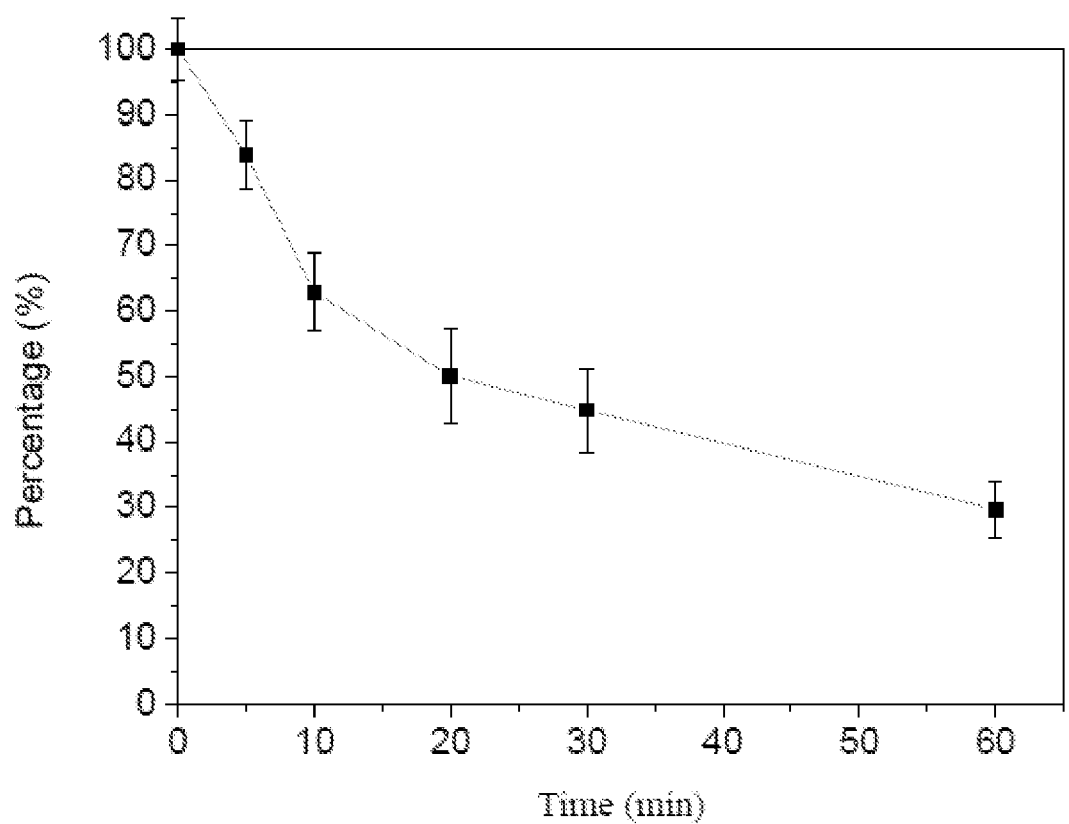
FIG. 8 shows the percentage of survived microcapsules versus sliding time in a ring-liner contact test.

The Cameron-Plint Ring-On-Liner reciprocating wear test (light loading, 60 minutes) and the Four-Ball Mill Rolling test (load under MPa to keep the balls under pure rolling mode, 3 hours) were performed FIG. 8 shows the percentage of survived capsules versus sliding time during a 60 minute ring-on-liner test. The majority of the capsules remained intact, indicating superior shear resistance.

EXAMPLE 6

Wear Test of Antiwear (AW) Agent and AW-Agent Containing Microcapsules

The three samples shown in Table 2 were tested in (i) a four-ball and (ii) ball on three flats tests in a four-ball wear tester (600 rpm, 60 minutes).

TABLE 2

| | |
|---|---|
| Sample 1 | Paraffin Oil (Baseline) |
| Sample 2 | Paraffin Oil + 1.0 wt. % Antiwear (AW) Agent |
| Sample 3 | Antiwear (AW) Agent Microcapsules (0.1-1 wt. %) |

Figure 9:
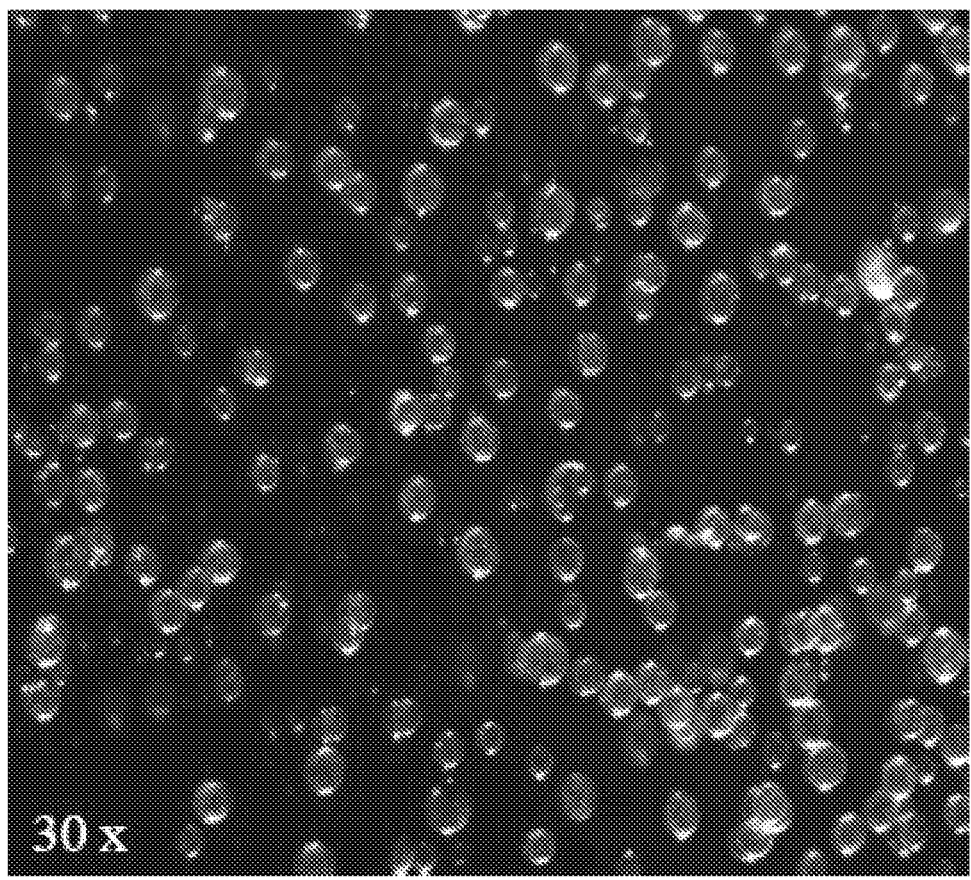
FIG. 9 shows the number of microcapsules equivalent to 1.0 wt. % antiwear additive.
Figure 10:
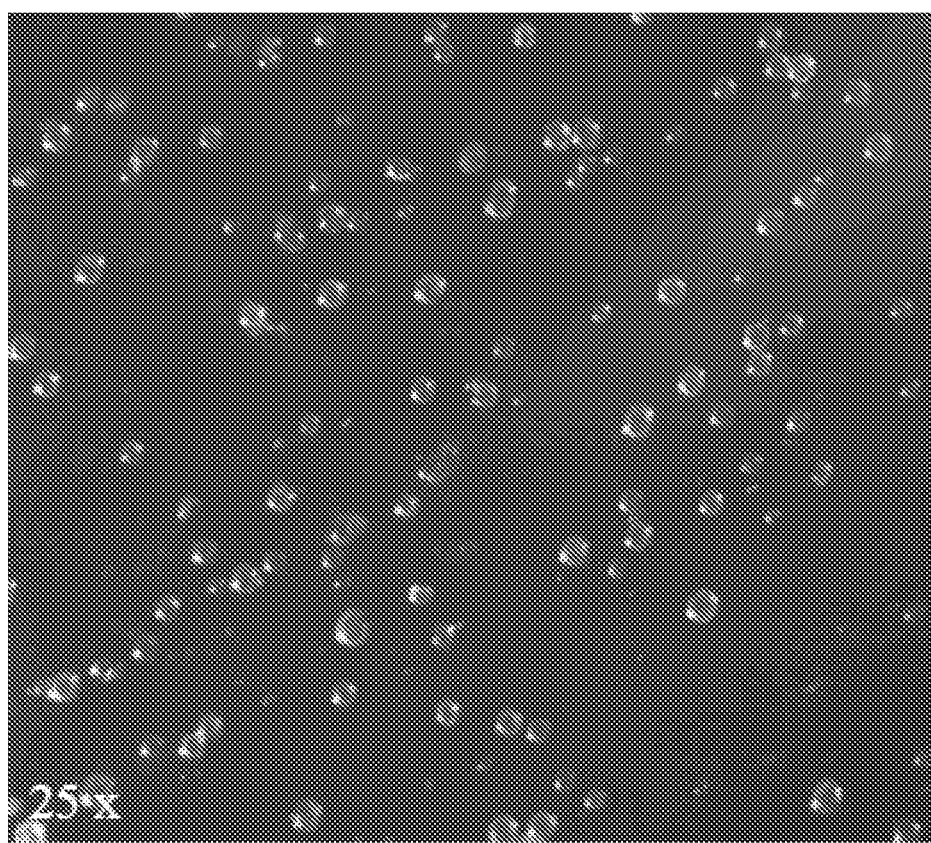
FIG. 10 shows the number of capsules equivalent to 0.4 wt. % antiwear additive.

FIG. 9 shows the number of capsules equivalent to 1.0 wt. % antiwear additive. FIG. 10 shows the number of capsules equivalent to 0.4 wt. % antiwear additive.

Figure 11:
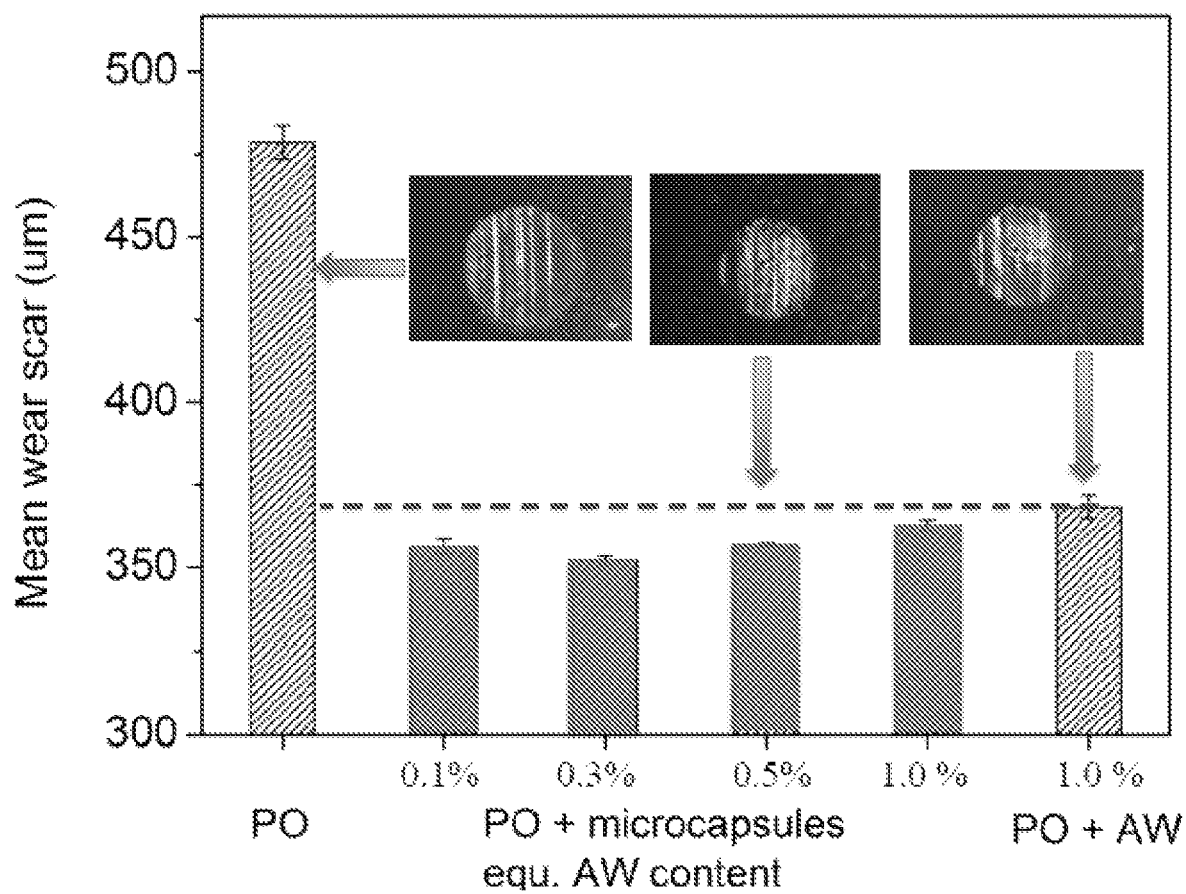
FIG. 11 shows the mean scar wear (microns) of paraffin oil, paraffin oil containing 1.0 wt. % antiwear additive, and microcapsules of paraffin oil containing 0.1, 0.3, 0.5 and 1.0 wt. % antiwear additive, determined in a four-ball wear test.

FIG. 11 shows the results of the four-ball wear test.

Figure 12:
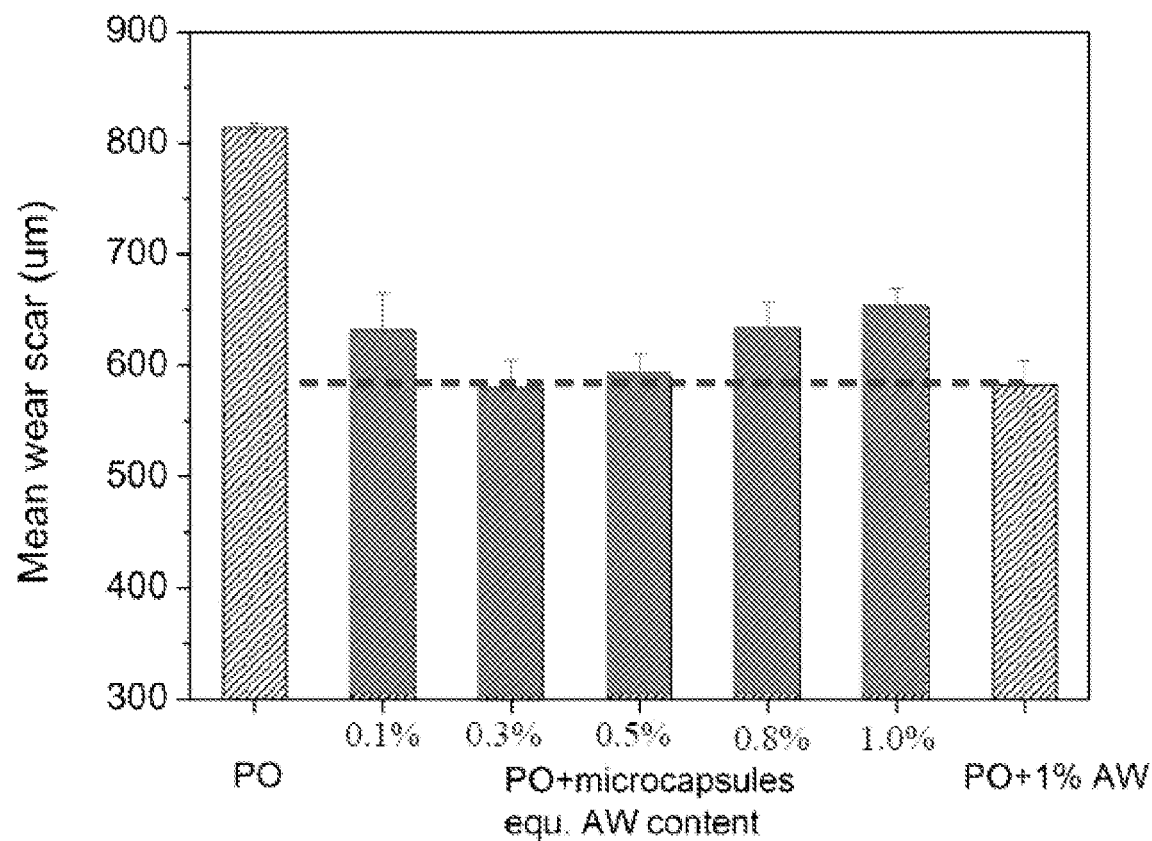
FIG. 12 shows the mean scar wear (microns) of paraffin oil, paraffin oil containing 1.0 wt. % antiwear additive, and microcapsules of paraffin oil containing 0.1, 0.3, 0.5 and 1.0 wt. % antiwear additive, determined in a balls-on-three-flats wear test.

FIG. 12 shows the results of the ball-on-three-flats wear test.

EXAMPLE 7

Oxidation Testing of Antioxidant Containing Microcapsules

Oxidation testing was performed to access the oxidative stability of antioxidant containing microcapsules described herein.

Table 3 describes the materials and test parameters used.

TABLE 3

| | |
|---|---|
| Base Oil | Paraffin Oil |
| Catalyst | Iron Naphthenate (2 wt. %) |
| Antioxidant | Amine/phenol mixture |
| Microcapsule Dosage | Equivalent to 1 or 2 wt. % Antioxidant |
| Temperature | 340° F. |
| Test Duration | 10 hours |

Table 4 describes the four different samples tested. Sample 1 (paraffin oil alone) and Sample 2 (paraffin oil and 1 wt % antioxidant, not microencapsulated) were used as controls. Samples 3 and 4 were prepared as described herein.

TABLE 4

| Sample | Contents |
|---|---|
| 1 | Paraffin Oil (No Antioxidant) |
| 2 | Paraffin Oil with 1 wt % Antioxidant (Not Microencapsulated) |
| 3 | Paraffin Oil with 1 wt % Antioxidant (Microencapsulated) |
| 4 | Paraffin Oil with 2 wt % Antioxidant (Microencapsulated) |

The oxidation testing was performed by heating each sample at 340° F. for 10 hours. Fourier transform infra-red (FT-IR) spectra were obtained at time=0, 2, 4, 6, 8 and 10 hours.

Figure 13:
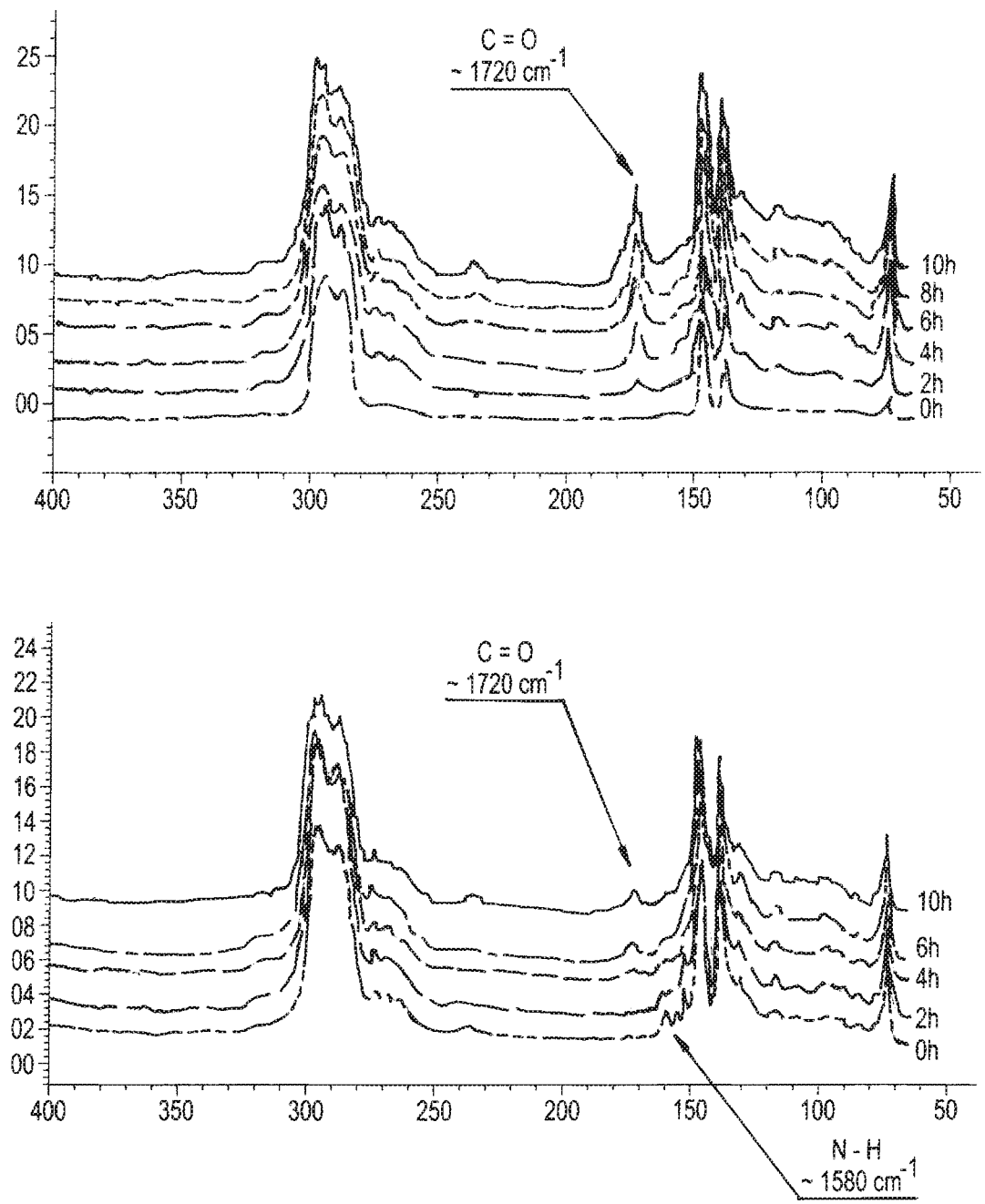
FIG. 13 shows Fourier Transform infra-red (FT-IR) spectra for Formulation 1 and Formulation 2 described in Example 7, during storage at 340° F. for 10 hours.

FIG. 13 shows the FT-IR spectra for Sample 1 (Paraffin Oil only, top spectrum) and Sample 2 (paraffin oil with 1 wt % antioxidant, not microencapsulated, bottom spectrum). As can be seen from FIG. 13, an oxidation peak (C=O stretch at ~1720 cm$^{-1}$) is clearly observed for Sample 1 after 2 hours at 340° F. This oxidation peak increases in intensity over time. For Sample 2, the oxidation peak is observed after 6 hours at 340° F., and again increases in intensity over time. Also, the N—H stretch at ~1580 cm$^{-1}$ (due to amine groups present in the antioxidant) decreases in intensity over time, showing degradation of the antioxidant.

Figure 14:
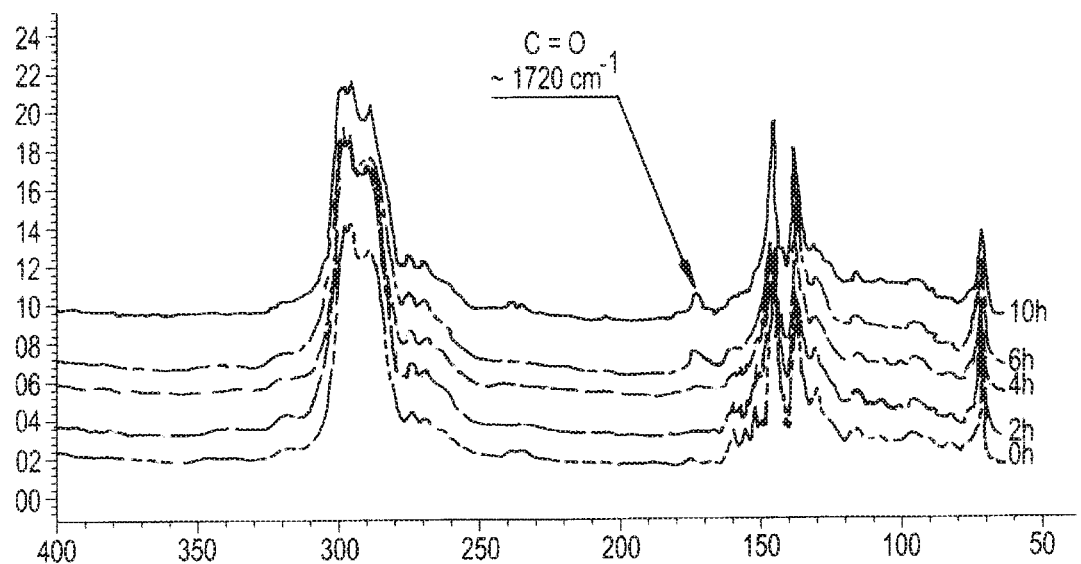
FIG. 14 shows FT-IR spectra for Formulation 2 and Formulation 3 described in Example 7, during storage at 340° F. for 10 hours.
Figure 14:
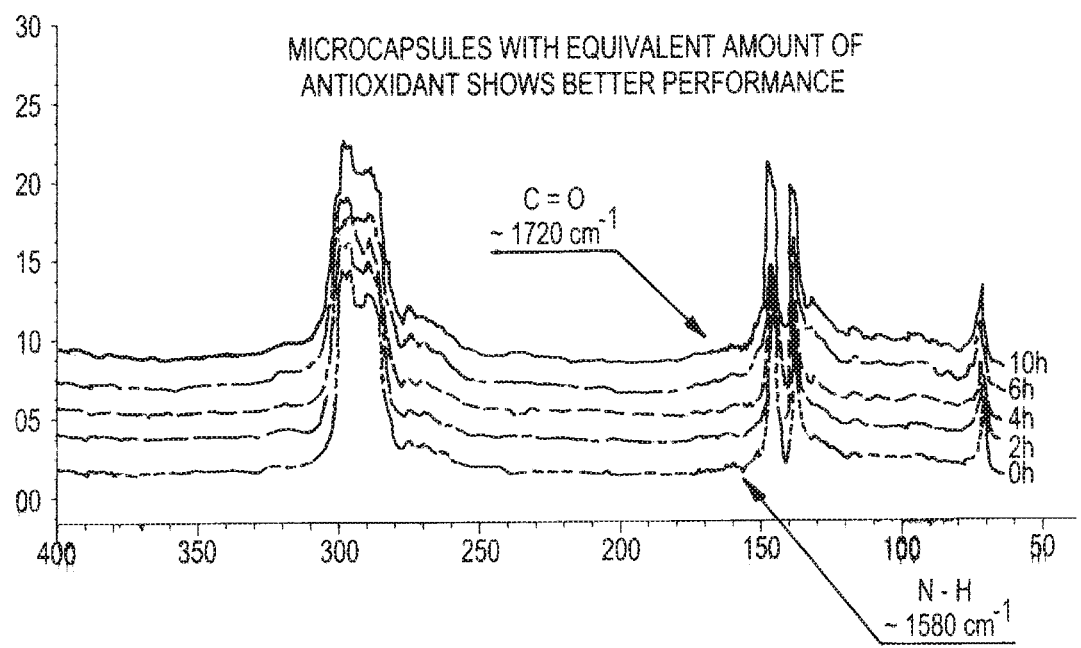

FIG. 14 shows the FT-IR spectra for Sample 2 (paraffin oil with 1 wt % antioxidant, not microencapsulated, top spectrum) and Sample 3 (paraffin oil with 1 wt % antioxidant, microencapsulated, bottom spectrum). As can be seen from FIG. 14, for Sample 3, the oxidation peak at ~1720 cm$^{-1}$ is not observed, even after 10 hours at 340° F. Also, the N—H stretch of the antioxidant at ~1580 cm$^1$ is weak, but remains constant, indicating little or no degradation of the antioxidant.

Figure 15:
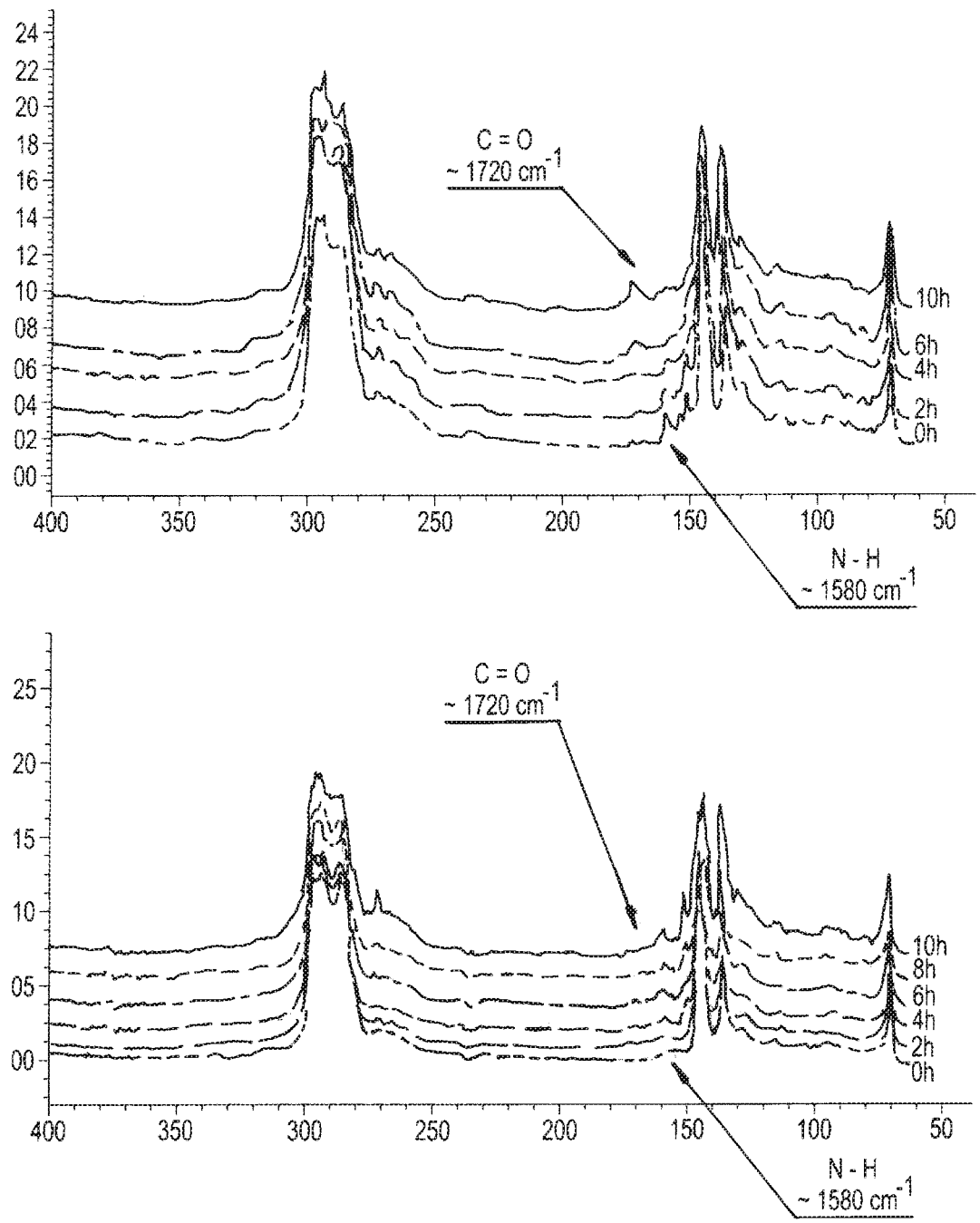
FIG. 15 shows FT-IR spectra for Formulation 2 and Formulation 4 described in Example 7, during storage at 340° F. for 10 hours.

FIG. 15 shows the FT-IR spectra for Sample 2 (paraffin oil with 1 wt % antioxidant, not microencapsulated, top spectrum) and Sample 4 (paraffin oil with 2 wt % antioxidant, microencapsulated, bottom spectrum). As can be seen from FIG. 15, for Sample 4, the oxidation peak at ~1720 cm$^{-1}$ is not observed, even after 10 hours at 340° F. Also, the N—H stretch of the antioxidant at ~1580 cm$^{-1}$ increases over time.

All references, including published patent applications and patents, are hereby incorporated by reference.

What is claimed is:

1. A process for preparing microcapsules of a lubricant additive, the process comprising
    (i) forming an aqueous solution comprising one or more emulsifiers;
    (ii) adding one or more curing catalyst and one or more cross-linking agent to the product of step (i) at a pH of between about 2 and about 5 to form an emulsion under stirring at about 500 to about 1000 rpm;
    (iii) adding a first lubricant additive to the emulsion of step (ii);
    (iv) adding a solution comprising (i) formaldehyde, paraformaldehyde or a combination thereof, and (ii) urea, melamine, or a combination thereof, to the product of step (iii); and
    (v) heating the product of step (iv) to form microcapsules of the lubricant additive, wherein
        (a) the microcapsules have a size between about 2 microns and about 40 microns, and
        (b) the shell or membrane enclosing the microcapsule core is (i) stable at a temperature of at least 200° C., and (ii) is of sufficient mechanical strength to be stable at a shear level of at least 1 GPa.

2. The process of claim 1, wherein the curing catalyst is selected from ammonium chloride and the cross-linking agent is selected from resorcinol.

3. The process of claim 1, wherein the molar ratio of (i) formaldehyde, paraformaldehyde or a combination thereof, to (ii) urea, melamine, or a combination thereof, is about 1 to about 3.

4. The process according to claim 1, further comprising
    (vi) cooling the resulting microcapsules; and
    (vii) isolating the microcapsules.

5. The process according to claim 4, wherein step (vii) further comprises washing the microcapsules with one or more solvents.

6. The process according to claim 1, wherein the emulsifier is selected from the group consisting of sodium dodecyl sulfate, sodium dodecylbenzenesulfonate, dioctyl sulfosuccinate sodium, poly(ethylene-alt-maleic anhydride), gum arabic, hexadecyltrimethylammonium bromide, poly(vinyl alcohol), poly(styrene-co-maleic anhydride), polyethylene glycol, polypropylene glycol, polyoxyethylene octyl phenyl ether, polysorbates, sorbitan esters, and any combination thereof.

7. The process according to claim 1, wherein the lubricant additive is selected from the group consisting of antioxidants, detergents, dispersants, antiwear additives, surface deactivators, acid neutralizing agents, lubricant film enhancers, smart viscosity modifiers, corrosion inhibitors, rust inhibitors, high base materials, reparative agents, power point depressants, seal compatibility agents, antifoam agents, viscosity index improvers, heat transfer agents, surface reactivity control agents, and any combination thereof.

8. The process according to claim 1, wherein the microcapsules have a size between about 2 and about 30 microns.

9. The process according to claim 1, wherein the microcapsules have a cell thickness of between about 0.4 and about 2 microns.

10. A microcapsule comprising one or more lubricant additives, prepared by a process according to claim 1.

11. The process according to claim 1, wherein the emulsifier is selected from the group consisting of sodium dodecyl sulfate, sodium dodecylbenzenesulfonate, dioctyl sulfosuccinate sodium, poly(ethylene-alt-maleic anhydride), hexadecyltrimethylammonium bromide, poly(vinyl alcohol), poly(styrene-co-maleic anhydride), polyethylene glycol, polypropylene glycol, polyoxyethylene octyl phenyl ether, polysorbates, sorbitan esters, and any combination thereof.

12. The process of claim 1, wherein the molar ratio of (i) formaldehyde, paraformaldehyde or a combination thereof, to (ii) urea, melamine, or a combination thereof, is about 1.5 to about 2.5.

13. The process of claim 1, wherein the molar ratio of (i) formaldehyde, paraformaldehyde or a combination thereof, to (ii) urea, melamine, or a combination thereof, is about 1 to about 1.9.

14. The process according to claim 1, wherein the microcapsules have a size between about 3 and about 28 microns.

15. The process according to claim 1, wherein the microcapsules have a cell thickness of between about 0.4 and about 0.5 microns.

16. A process for preparing microcapsules of a lubricant additive, the process comprising
    (i) forming an aqueous solution consisting essentially of one or more emulsifiers selected from the group consisting of sodium dodecyl sulfate, sodium dodecylbenzenesulfonate, dioctyl sulfosuccinate sodium, poly(ethylene-alt-maleic anhydride), hexadecyltrimethylammonium bromide, poly(vinyl alcohol), poly(styrene-co-maleic anhydride), polyethylene glycol, polypropylene glycol, polyoxyethylene octyl phenyl ether, polysorbates, sorbitan esters, and any combination thereof;
    (ii) adding one or more curing catalyst and one or more cross-linking agent to the product of step (i) at a pH of between about 2 and about 5 to form an emulsion under stirring at about 500 to about 1000 rpm;
    (iii) adding a first lubricant additive to the emulsion of step (ii);
    (iv) adding a solution comprising (i) formaldehyde, paraformaldehyde or a combination thereof, and (ii) urea, melamine, or a combination thereof, to the product of step (iii); and
    (v) heating the product of step (iv) to form microcapsules of the lubricant additive, wherein
        (a) the microcapsules have a size between about 2 microns and about 40 microns, and
        (b) the shell or membrane enclosing the microcapsule core is (i) stable at a temperature of at least 200° C., and (ii) is of sufficient mechanical strength to be stable at a shear level of at least 1 GPa.

17. The method of claim 1, wherein the microcapsules of the lubricant additive exhibits enhanced thermal stability and/or anti-wear performance compared to the lubricant additive not in the form of microcapsules.

18. The method of claim 1, wherein the microcapsules of the lubricant additive are stable under contact pressures up to about 800 MPa.

19. The method of claim 1, wherein step (iv) comprises adding a solution comprising formaldehyde and urea to the product of step (iii).

20. The method of claim 1, wherein step (iv) comprises adding a solution comprising formaldehyde and melamine to the product of step (iii).

21. The method of claim 1, wherein step (iii) comprises adding two or more lubricant additives.

22. The method of claim 16, wherein step (iii) comprises adding two or more lubricant additives.

* * * * *